(12) United States Patent
Cohen

(10) Patent No.: US 7,516,227 B2
(45) Date of Patent: Apr. 7, 2009

(54) METHOD AND APPARATUS FOR NETWORK DECEPTION/EMULATION

(76) Inventor: Fred Cohen, 572 Leona Dr., Livermore, CA (US) 94550

( * ) Notice: Subject to any disclaimer, the term of this patent is extended or adjusted under 35 U.S.C. 154(b) by 42 days.

(21) Appl. No.: 11/463,301

(22) Filed: Aug. 8, 2006

(65) Prior Publication Data

US 2007/0115993 A1     May 24, 2007

Related U.S. Application Data

(62) Division of application No. 09/696,893, filed on Oct. 26, 2000, now Pat. No. 7,107,347.

(60) Provisional application No. 60/165,581, filed on Nov. 15, 1999.

(51) Int. Cl.
    *H04L 9/32* (2006.01)
(52) U.S. Cl. ............... 709/228; 709/220; 709/224; 713/202
(58) Field of Classification Search ............... 709/224, 709/228, 220; 726/25; 370/396; 713/400
    See application file for complete search history.

(56) References Cited

U.S. PATENT DOCUMENTS

| | | | |
|---|---|---|---|
| 5,032,979 A | 7/1991 | Hecht et al. | |
| 5,253,330 A * | 10/1993 | Ramacher et al. | 706/42 |
| 5,414,833 A | 5/1995 | Hershey et al. | |
| 5,488,715 A | 1/1996 | Wainwright | |
| 5,557,742 A | 9/1996 | Smaha et al. | |
| 5,606,668 A | 2/1997 | Shwed | |
| 5,621,889 A | 4/1997 | Lermuzeaux et al. | |
| 5,796,942 A | 8/1998 | Esbensen | |
| 5,848,261 A * | 12/1998 | Farry et al. | 703/23 |
| 5,966,650 A | 10/1999 | Hobson et al. | |
| 6,070,244 A * | 5/2000 | Orchier et al. | 726/1 |
| 6,088,804 A * | 7/2000 | Hill et al. | 726/25 |
| 6,145,084 A * | 11/2000 | Zuili et al. | 726/3 |
| 6,298,445 B1 * | 10/2001 | Shostack et al. | 726/25 |
| 6,671,281 B1 * | 12/2003 | Tsuda | 370/396 |
| 6,738,916 B1 * | 5/2004 | Gladden et al. | 713/400 |
| 7,072,825 B2 * | 7/2006 | Wang et al. | 703/28 |

OTHER PUBLICATIONS

Hasenstein, M.; Diplomarbeit, IP Network Address Translation, http:www.suse.de/~mha/HyperNews/get/linux-ip-nat.html (1997) 32 pages.

Microsoft TechNet; SNA Open Gateway Architecture, http://www.microsoft.com/TechNet/sna/technote/soga.asp, pp. 1-20.

(Continued)

*Primary Examiner*—Khanh Dinh
(74) *Attorney, Agent, or Firm*—Quine Intellectual Property Law Group LLC; Stephen J. LeBlanc

(57) ABSTRACT

A number of innovations in the field of networking are disclosed. These techniques use multiple address translation to achieve effective deceptions, emulations, extended private networks and related goals. A further embodiment using a deception network having a number of different actual computer systems each performing emulation where deceived datagrams are routed to an actual machine that is particularly able to perform the desired emulation. The invention allows the emulation to receive a datagram just at it would appear at an external access point, operate on that datagram and return a datagram which is then passed through a deception wall using multiple address translations.

20 Claims, 19 Drawing Sheets

OTHER PUBLICATIONS

Gateways, http://www.sohointer.net, 15 pages.

ComSoft Knowledge Share; http://www.vicomsoft.com/knowledge/reference/firewalls 1.html, pp. 1-10.

Microsoft Windows 2000 Server Documentation http://www.windows.com/windows2000/en/server/help/sag_rras-ch2-adv_11.htm, 1 page.

Cisco IOS Network Address Translation (NAT) http://www.ieng.com/warp/public/701/60.html, pp. 1-9.

Enterasys Networks, Network Address Translation, http://www.enterasys.com/products/whitepapers/ssr/network-trans/ pp. 1-6.

Winkler, J.R., A Unix Prototype for Intrusion and Anomaly Detection In Secure Networks, *Proceedings, National Computer Security Conference*, Washington D.C. Oct. 1990, Planning Research Corp.

Sebring, M.M, et al. Expert Systems in Intrusion Detection; A Case-Study, Proceedings of the 11th National Computer Security Conference, 1998, pp. 74-81.

Debar, H., et al. A Neural Network Component For An Intrusion Detection System, Proceedings of the 1992 IEEE Computer Society Symposium on Research in Security and Privacy, Cedex, France, 1992 pp. 204-250.

Dowell, C., et al. The ComputerWatch Data Reduction Tool, Proceedings of the 13th National Computer Security Conference, 1990, pp. 99-108.

Snapp, S.R. et al, DIDS (Distributed Intrusion Detection System) - Motivation, Architecture, And An Early Prototype, Proceedings of the 14th National Computer Security Conference, 1991, pp. 167-176.

Tener, William T., Discovery; An Exret System in the Commercial Data Security Environment., Originally presented at the Fourth IFIP Symposium on Information Systems Security, Monte Carlo, 1986. Also appeared in *Security and Protection in Information Systems*, ed. Andre Grissonanche, pp. 261-68. 1989 Elsevieer Science Publishers, B.V. (North Holland) pp. 45-53 as submitted.

Snapp, S.R. Signature Analysis and Communication Issues In A Distributed Intrusion Detection System, 1991, Committee in Charge, submitted in partial satisfaction of the requirements for Master of Science in Computer Science at the University of California Davis pp. 1-40.

Avritzer, A. et al., Reliability Testing of Rule-Based Systems, 1996 International Symposium on Software Reliability Engineering, White Plains, N.Y., Oct. 30-Nov. 2. (7 pages).

Venter, H.S. et al. "Data Packet Intercepting on the Internet: How and Why? A Closer look at Existing Data Packet-Intercepting Tools" Computers & Security. International Journal Devoted to the Study of Technical and Financial Aspects of Computer Security, Elsevier Science Publishers. Amsterdam, NL vol. 17, No. 8, 1998, pp. 683-692, XP004150446 ISSN: 0167-4048.

Cohen F., "Simulating Cyber Attacks, Defences, and Consequences" Computers & Security, International Journal Devoted to the Study of Technical and Financial Aspects of Computer Security, Elsevier Science Publishers. Amsterdam, NL, vol. 18, No. 6, 1999, pp. 479-518, XP004178853 ISSN: 0167-4048.

Bellovin (1992) "There Be Dragons." Proceedings of the Third Usenix UNIX Security Symposium. Baltimore (Sep. 1992). World Wide Web at http://www.research.att.com/~smb/papers/dragon.pdf.

Cheswick et al. (1991) "An Evening with Berferd: In Which a Cracker is Lured, Endured, and Studied". World Wide Web at http://www.deter.com/unix/papers/berferd_cheswick.pdf.

Cisco Systems Inc. (1999) "Cisco IOS Network Address Translation (NAT)" World Wide Web at http://www.ieng.com/warp/public/701/60.html. pp. 1-9 of 9.

Cohen (1992) "Operating System Protection Through Program Evolution Computers and Security". World Wide Web at http://all.net/books/IP/evolve.html. pp. 1-22 of 22.

Cohen (1996) "A Note on Detecting Tampering with Audit Trails IFIP-TC11" Computers and Security. World Wide Web at http://www.all.net/books/audit/audmod.html. pp. 1-10 of 10.

Cohen (1996) "A Note on Distributed Coordinated Attacks". World Wide Web at http://www.all.net/books/dca/background.html. p. 1 of 1.

Cohen (1996) "Internet Holes - Incident at All.Net", Network Security Magazine, Apr., 1996. World Wide Web at http://all.net/journal/netsec/1996-04,html. pp. 1-11 of 11 total.

Cohen (1996) "Internet Holes - Internet Lightning Rods" Networks Security Magazine, (Jul., 1996), World Wide Web at http://all.net/journal/netsec/1996-07-2.html. pp. 1-5 of 5.

Cohen (1996) "Internet Holes - The Human Element" Network Security Magazine, Mar., 1996. World Wide Web at http://all.net/journal/netsec/1996-03.html. pp. 1-5 of 5.

Cohen (1996) "National Info-Sec Technical Baseline - Intrusion Detection and Response" World Wide Web at http://www.all.net/journal/ntb/ids.html. pp. 1-21 of 21.

Cohen (1996) "Why is thttpd Secure?" Computers and Security. World Wide Web at http://ww.all.net/journal/white/whitepaper.html. pp. 1-11 of 11 total.

Cohen (1998) "National InfoSec Technical Baseline - At the Intersection of Security, Networking, and Management" World Wide Web at http://www.all.net/journal/ntb/nsm.html. pp. 1-17 of 17.

Enterasys Networks (2000) "Network Address Translation" World Wide Web at http://www.enterasys.com/products /whitepapers/ssr/network-trans/. pp. 1-6 of 6.

Hasenstein (1997) "Diplomarbeit: IP Network Address Translation" World Wide Web at http://www.suse.de/~mha/linux-ip-nat/diplom/. 32 pages.

Microsoft Corporation (2000) "Microsoft TechNet: SNA Open Gateway Architecture" World Wide Web at http://www.microsoft.com/TechNet/sna/technote/soga.asp. pp. 1-20.

Microsoft Corporation (2000) "Microsoft Windows 2000 Servers Documentation" World Wide Web at http://www.windows.com/windows2000/en/server/help/sag_rras-ch2-adv_11.htm. p. 1 of 1.

Six Sigma Networks (2000) "Types of Internet Gateways" World Wide Web at http://www.sohointer.net/learn/gataways.htm, pp. 1-15 of 15 total.

Vicom Technology Ltd. (2000) "ViComSoft Knowledge Share Firewall: Q & A". World Wide Web at http://www.vicomsoft.com/knowledge/reference/firewalls1.html. pp. 1-10 of 10.

Cohen (1985) "Algorithmic Authentication of Identification." Information Age, V7, #1 (Jan. 1985), pp. 35-41.

Cohen (1998) "*Managing Network Security: The Unpredictability Defense*." Located on the World Wide Web at http://all.net/journal/netsec/1998-04.html. Fred Cohen & Associates, Apr. 1998.

Cohen et al. (1998) "*A Preliminary Classification Scheme for Information System Threats, Attacks, and Defenses; A Cause and Effect Model; and Some Analysis Based on That Model*." Located on the World Wide Web at http://all.net/journal/ntb/cause-and-effect.html. Sandia National Laboratories, Sep. 1998.

\* cited by examiner

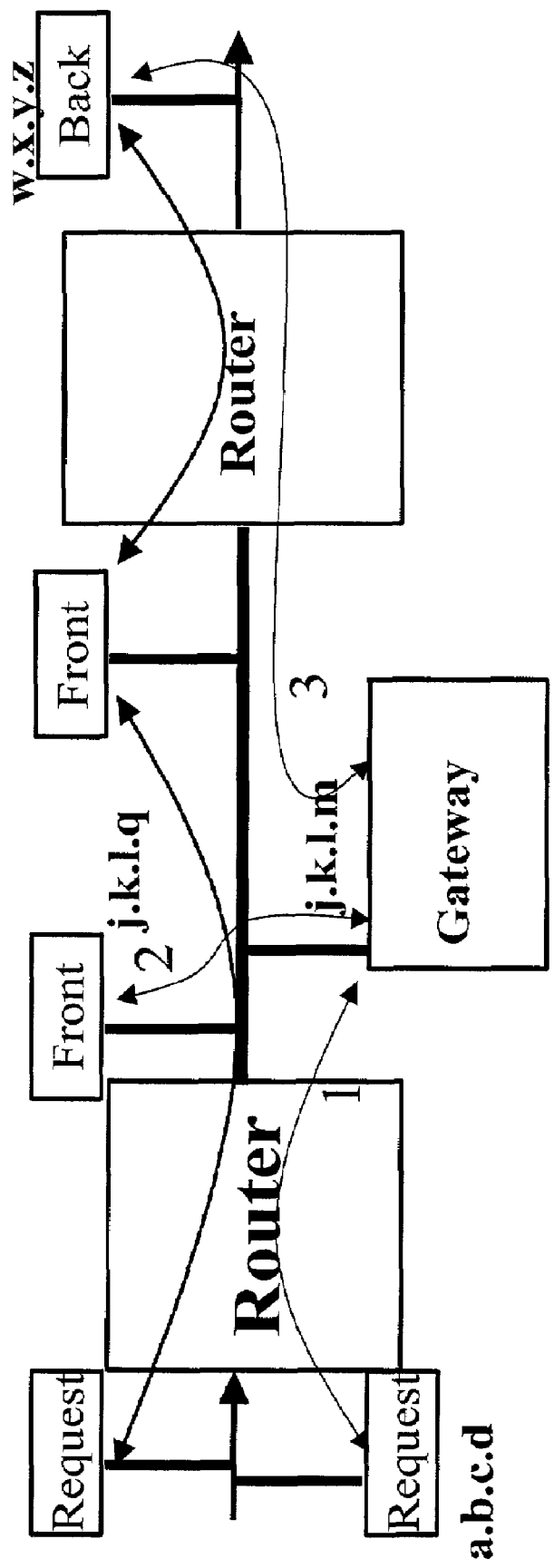

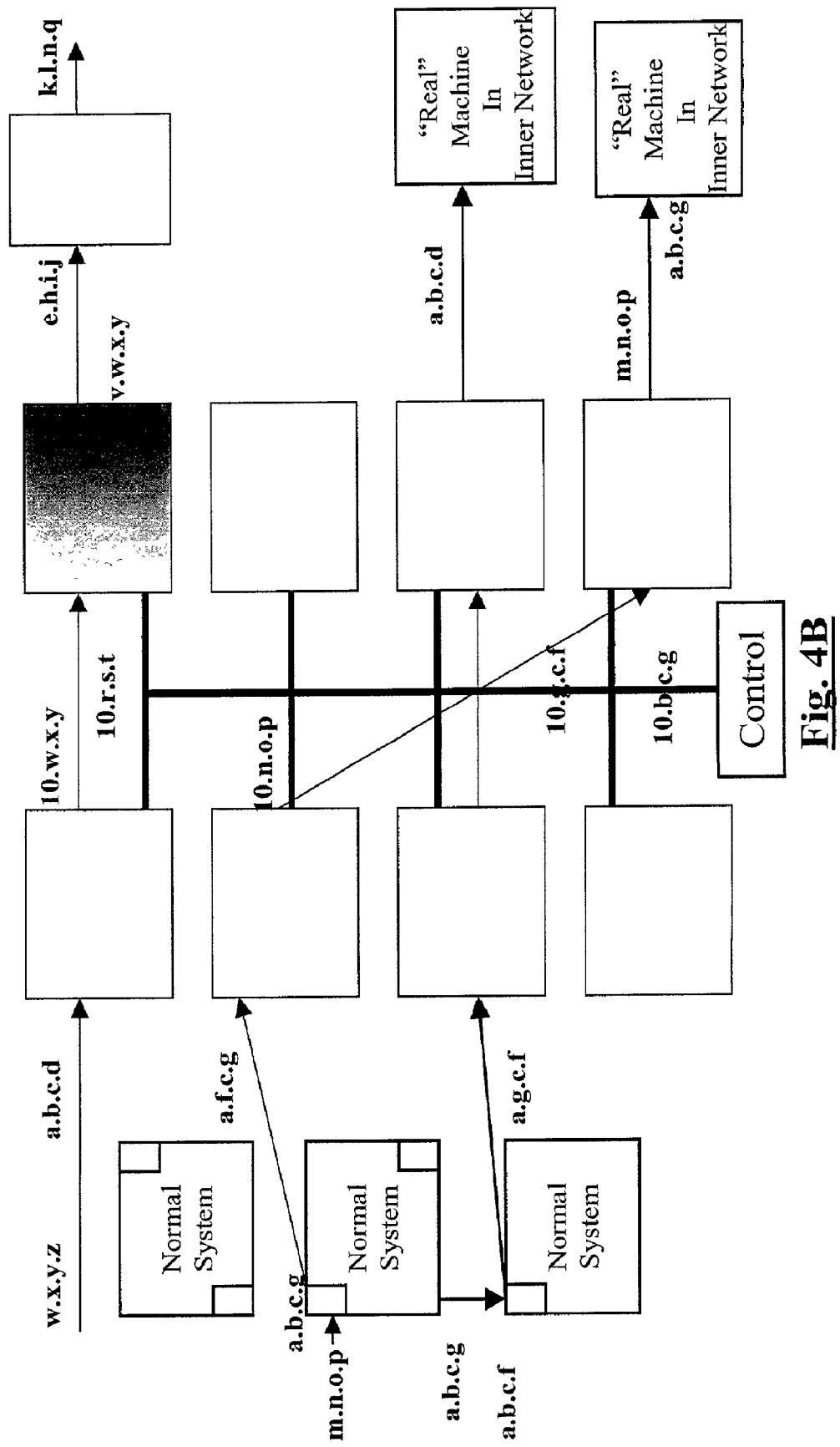

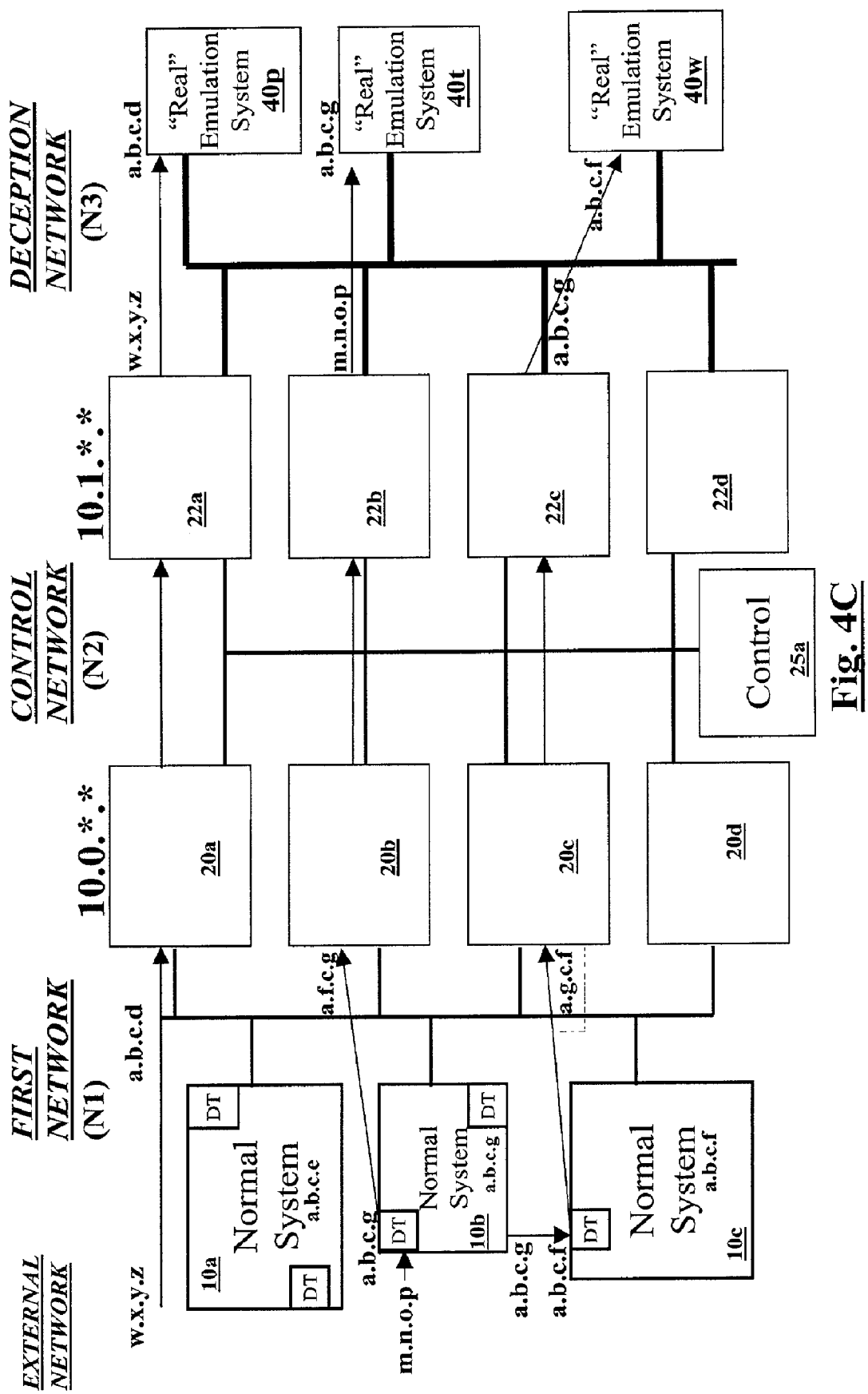

METHOD AND APPARATUS FOR NETWORK DECEPTION/EMULATION

This application is a Divisional of A/N 09/696,893, filed on Oct. 26, 2000, now U.S. Pat. No. 7,107,347, and claims benefit of priority from provisional A/N 60/165,581, filed Nov. 15, 1999, both of which are incorporated herein by reference in their entirety for all purposes.

FIELD OF THE INVENTION

The present invention is related to the field of networking of information systems. More specifically, the present invention is various aspects is directed to network emulation, deception, and techniques using advanced address translation.

BACKGROUND OF THE INVENTION

Throughout the history of war, deception has been a cornerstone of successful offense and defense. Indeed, the history of information protection includes many examples of the use of deception for defense including the use of honey pots to gain insight on attacker behavior, the use of lightning rods to draw fire, and the use of program evolution as a technique for defending against automated attacks on operating systems. Even long before computers existed, information protection through deception was widely demonstrated. The history of information protection also demonstrates that the use of deception by attackers far outstrips its use by defenders in this field.

The present invention in one part concerns novel and advanced techniques for using deception in information systems protection. The invention in further embodiments, comprises independently novel techniques of network emulation and address substitution, which are described herein and should be understood as independent inventions.

In particular embodiments, the present invention utilizes techniques of address translation. Address translation in general is a known technique in the art. FIG. 1B is a block diagram illustrating address translations between a first client network and a second server network using a proxy server as known in the prior art. One common use of translations is to separate an inside network containing internal IP addresses from an outside network, such as the Internet. Consider an office LAN with 100 computers, each having an IP address of the form 10.*.*.*. The computers can talk with any other computer on the LAN, using the 10.*.*.* IP addresses as source and destination addresses in transmitted packets. However, when an inside computer wishes to communicate to an address on the outside internet, an issue arises in that the internal IP address may not be a valid external IP address. For example, destination addresses beginning with 10. are reserved for private networking and are not routable on the Internet. Also, internal IP addresses may have been assigned without acquiring the corresponding external IP address. So an internal address of 24.24.24.2, for example, may be registered in the external network to another institution. Therefore, while an inside computer 10.n.m.o might be able to transmit a packet out over the Internet with a valid external destination address, no packets can be returned from the external network if the original source address is 10.n.m.o or another not valid IP address because that address cannot be correctly routed over the external Internet.

A second issue is that valid external IP addresses can be expensive, and an institution with a very large number of computers may not wish to buy a valid external IP address for each computer if it is not necessary. In the simplest case, an institution might wish to use just one external IP address for its entire LAN.

To solve these problems, network administrators use a network computing device or logic module sometimes referred to as a PROXY SERVER or an ADDRESS TRANSLATION GATEWAY (ATG). An ATG sits between a private LAN network or server network and the outside network. It receives any packet on the LAN that is addressed to an outside computer, and translates at least the source address of that packet before placing that packet on the Internet. A return packet is routed back to the ATG using the translated source address as the destination and the ATG or proxy again translates the packet addresses and places the packet on the internal network.

Translations can be accomplished by a variety of techniques known in the art, such as table-lookup, rules-based translations algorithms, using port fields to hold portions of an address, or using transmit and response timing to match packets. An ATG keeps track of internal address/external address pairs so that when it receives packets from the external network, they can be sent over the LAN to the correct individual machine. The ATG/proxy function can be performed by logic within another network device (such as a firewall or server or bridge) or the function can be performed by a dedicate gateway computer. Additional information about gateways, internet addressing, and subnetworks can be found at www.sohointer.net/learn/gateways.htm and www-.sohointer.net/learn/addrs.htm and their referenced pages.

An ATG functionality will typically be incorporated with other functions in a network devices. Thus, devices acting as firewalls, routers, or servers can include ATG functions. Network capable devices with ATG functionality are available from a number of different vendors. Some examples of such devices include Cisco Routers, the Linux OS, FreeBSD.

Standard configurations and capabilities provided by such devices include:
1. At least two interfaces for connecting between two separate communication environments (such as a private (or local) network and an outside network).
2. At least one external interface able to detect and receive packets on an external network directed to the ATGs external network addresses.
3. At least one internal interface able to detect and receive packets on said internal network directed to one or more external network addresses.
4. An address translation ability to change source and destination addresses for packets transferred between the internal interface and the external interface.
5. An address facility able to map between external addresses and internal addresses.

The inventor has written a number of papers and books regarding network and data security deception. Many of these writings are available at http://all.net/. A few papers of interest are listed in the section below.

REFERENCES

1. [Dunnigan95] Jim (James F.) Dunnigan and Albert A. Nofi, Victory and Deceit—Dirty Tricks at War, William Morrow and Co., 1995.), [In this book, examples of the historical use of deception are categorized into concealment, camouflage, false and planted information, ruses, displays, demonstrations, feints, lies, and insight.]
2. [Bellovin92] S. M. Bellovin. There Be Dragons. Proceedings of the Third Usenix UNIX Security Symposium. Baltimore (September 1992). [In this paper, numerous foiled attacks from the Internet against AT&T are described and the author details how some of these are traced and what is done about them.
3. [Cohen96] F. Cohen, Internet Holes—Internet Lightning Rods Network Security Magazine, July, 1996. [This paper describes the use of a system as an intentional target over a period of several years to draw fire from more critical systems and to learn about attack and defense behavior.] [Drill Down]
4. [Cheswick91] Bill Cheswick, Steve Bellovin, Diana D'Angelo, and Paul Glick, An Evening with Berferd [In this paper, the details of an attack rerouted to a Honey Pot are demonstrated. The defenders observed and analyzed attacks with a jury-rigged fake system that they called the 'Jail'.] [Drill-Down]
5. [Cohen92] F. Cohen, Operating System Protection Through Program Evolution Computers and Security 1992. [In this paper, techniques for automatically modifying programs without changing their operation are given as a method of camouflage to conceal points of attack.] [Drill-Down]
6. [Cohen97] F. Cohen, Information System Attacks—A Preliminary Classification Scheme Computers and Security, 1997. [This paper describes almost 100 different classes of attack methods gathered from many different sources.] [Drill-Down]
7. [Cohen97-2] F. Cohen, Information System Defenses—A Preliminary Classification Scheme Computers and Security, 1997. [This paper describes almost 140 different classes of protective methods gathered from many different sources.] [Drill-Down]
8. [Cohen96-03] F. Cohen Internet Holes—The Human Element, Network Security Magazine, March, 1996 [Drill-Down]
9. [Cohen98] F. Cohen et. al. Model-Based Situation Anticipation and Constraint
10. [Cohen96-04] F. Cohen, Internet Holes—Incident at All.Net [This paper described an Internet-based distributed coordinated attack against the all.net Internet site and gives examples of deception used by attackers to create the impression that deception for defense is unfair and inappropriate] [Drill-Down]
11. [Cohen96-DCA] F. Cohen, A Note On Distributed Coordinated Attacks, [This paper describes a new class of highly distributed coordinated attacks and methods used for tracking down their sources.] [Drill-Down]
12. [Cohen85] F. Cohen, Algorithmic Authentication of Identification, Information Age, V7#1 (January 1985), pp 35-41.
13. [Pessin86] Esther Pessin. Pirate, N.Y. (UPI). Apr. 29, 1986. [HBO on January 15 became the first major cable channel to scramble its signals to prevent satellite dish owners from picking up HBO programming for free and the interruption which appeared during a movie early Sunday apparently was a protest of the policy. The hacker dubbed himself "Captain Midnight" and broke into the film "The Falcon and the Snowman" with a message that flickered on television screens across the nation for anywhere from 10 seconds to more than a minute. The cable raider broke into HBO with a multicolor test pattern and a five-line message printed in white letters: "Good evening HBO From Captain Midnight $12.95/month? No way! Showtime/Movie Channel beware."]
14. [Cohen95-3] F. Cohen, A Note on Detecting Tampering with Audit Trails, IFIP-TC11, 'Computers and Security', 1996 [Drill-Down]
15. [Wilson68] Andrew Wilson, The Bomb and the Computer Delacorte Press, 1968. [This excellent book describes much of the history of strategic and tactical war gaming from its inception through the introduction of computers to the art.]
16. [Cohen98-04] F. Cohen Managing Network Security— The Unpredictability Defense [Donn Parker asserts that in interviewing hundreds of computer criminals who had been caught, a few things stood out in common. One is that they depend on predictability of defenses as a cornerstone of their attacks. Many of them stated that unless they were certain of how and when things would happen, they would not commit their crimes. Furthermore, the way many of them were detected and caught was by unanticipated changes in the way the defenses worked. If Donn is right . . . ] [Drill-Down]
17. [Howard97] J. Howard, An Analysis Of Security Incidents On The Internet Dissertation at Carnegie-Mellon University [This research analyzed trends in Internet security through an investigation of 4,299 security-related incidents on the Internet reported to the CERT. Coordination Center (CERT./CC) from 1989 to 1995. Prior to this research, our knowledge of security problems on the Internet was limited and primarily anecdotal. This information could not be effectively used to determine what government policies and programs should be, or to determine the effectiveness of current policies and programs. This research accomplished the following: 1) development of a taxonomy for the classification of Internet attacks and incidents, 2) organization, classification, and analysis of incident records available at the CERT./CC, and 3) development of recommendations to improve Internet security, and to gather and distribute information about Internet security. . . . "Estimates based on this research indicated that a typical internet domain was involved in no more than around one incident per year, and a typical Internet host in around one incident every 45 years."]
18. [Cohen96-03] F. Cohen, Internet Holes—The Human Element ["I've mentioned our Internet site before, and I've probably told you that we detect more than one suspicious activity per day on average."] [Drill-Down]
19. [Cheswick94], W. Cheswick and S. Bellovin, Firewalls and Internet Security—Repelling the Wiley Hacker Addison-Wesley, 1994. [This book is one of the most authoritative early sources of information on network firewalls. It includes many details of attack and defense techniques as well as case studies of attacks against AT&T.]
20. [Cohen95] F. Cohen, Why is thttpd Secure? Published in slightly altered form in Computers and Security, 1996 [A "secure" server daemon was written by Management Analytics in the week of Jun. 5-9, 1995. We believe this daemon to be secure in the sense that it does exactly what it is supposed to do—nothing more and nothing less. This paper describes the inner workings of this very small program, why we think it is trustworthy, and where our assumptions may fail. This server was subsequently mathematically proven to meet its security requirements.] [Drill-Down]
21. [Cohen97-3] National Info-Sec Technical Baseline—Intrusion Detection and Response [This paper covers the state of the art in intrusion detection and includes an extensive review of the literature while identifying key limitations of current intrusion detection technology.] [Drill-Down]
22. [Cohen-98] National InfoSec Technical Baseline—At the Intersection of Security, Networking, and Management [This paper covers the state of the art in network security management and secure network management and includes an extensive review of the current state of the art and identifies key limitations of current technology.] [Drill-Down]

SUMMARY OF THE INVENTION

The present discussion illustrates a number of innovations in the field of networking. The invention in various specific aspects and embodiments is related to deception techniques, multiple address translation methods, and proxy services for deception and emulation. According to these novel methods and apparatuses, used either alone or in combinations, complex emulations and deceptions can be accomplished.

In some embodiments, these complex emulations and deceptions can be accomplished using standard networking devices with standard ADDRESS TRANSLATION GATEWAY (or proxy addressing)ability, in novel configurations according to the invention. The use of standard networking devices can reduce system installation and management costs. There are a wide range of additional specific applications of the novel methods and apparatuses, some of which are described as specific examples herein.

In specific embodiments, the present invention involves innovations to improve both the fidelity of deceptions or emulations and the ability to do large scale deceptions or emulations. These innovations include responding to multiple incoming IP addresses in conjunction with deception techniques.

In a further embodiment, a deception system can act as a firewall that allows only permitted traffic and rapidly and automatically reacts to illicit access attempts by altering deceptions. In a further embodiment, the invention uses proxy mechanisms to provide enhanced deception or emulation. Proxies translate IP addresses and forward packets and are at the heart of some existing firewall technologies.

Deceptions on Multiple Addresses

FIG. 3 is a block diagram showing a deployment of an advanced Deception Tool Kit within a network, according to one embodiment of the present invention, with the Deception Tool Kit providing deceptive services at multiple addresses.

In specific embodiments, the present invention can be used with innovations that can improve both the fidelity of deceptions or emulations and the ability to do large scale deceptions or emulations. These innovations include responding to multiple incoming IP addresses from a machine in conjunction with deception techniques. As such, in this aspect, the invention provides the means to do large scale deceptions at a very low cost. In a further embodiment, the use of flexible characteristics based on source or destination IP address allows a single machine to emulate a large number (such as up to 4,000) different systems, each with unique characteristics, thus providing a rich environment for deception as well as network emulation.

In further embodiments, emulations may be altered over time to emulate the characteristics of real networks, such as turning off machines at various times of day at different places in the world, the movement of machines from network to network, and the alteration of systems and usage patterns over time. In various embodiments, these and other alterations may be controllable from a single deception control system or from a distributed deception control system thus providing improved deception fidelity on a large scale for a very low cost.

Multiple Address Translations

In specific embodiments of the present invention, the innovation of multiple address translation involves using two or more proxy or other address translation mechanisms to facilitate high fidelity deception or to accomplish other goals, such as emulation, extended private networking, obscuring paths, or facilitation multiple processor systems. These goals are implemented by translating from an original address into an intermediate address, and then translating back to the original address.

It may aid in understanding to consider as example a simple case of two address translations: the first being a translation from an "outside" network into an "intermediate" or "control" network; and the second being a translation from the "intermediate" or "control" network to an "inside" or "deception" network. FIG. 4A-C, which are discussed in more detail below, shows one example of such a translation. While this is a good functional example of multiple address translations according to the invention, the method of the invention can also be practiced on different hardware configurations, such as within a single network simulation device as described below. In further embodiments, the present invention can extend known translating schemes by using multiple translations to produce packets in an inside network or system that are identical to the original packets. In further embodiments, the invention provides a method for accomplishing complex emulations, deceptions, etc., using standard networking equipment. In further embodiments, the present invention, by providing such translation into a different IP address and then back into the original IP address, provides a means by which existing protocols and systems can be used to redirect traffic as if it were passing through a cross-point switch.

Emulation/Deception Networks Using a Variety of "Real" Hardware/Software Platforms In a further embodiment, the present invention allows flexible control of a deception or emulation system in which a set of services, behaviors, paths, and hardware configurations can be emulated at very high fidelity by routing requests to different deception or emulation hardware configurations. Thus, a deception system according to the present invention, instead of simulating a Sun computer running an Apache Web server on a given IP address and port but performing the simulation on a different kind of computer system, can redirect "deceived" traffic so that the traffic is handled by an actual Sun computer running an actual Apache web server and responding to the IP packets as originally addressed in the outside network. According to this aspect, the present invention can use a small number of different actual computer systems in an emulation/deception network and can configure and reconfigure access to them and their behavior in real time to provide an extremely high fidelity emulation/deception. In a further embodiment, more than two address translations can be used with similar effect in cases when multiple hops are required for the purpose of the deception.

According to various embodiments of the present invention, each of these techniques on their own provides a very substantial improvement to the ability to provide large scale high fidelity deception. But when combined together, these techniques provide the means, for example, for fewer than 100 computers to do a very high quality emulation of a network of tens of thousands of computers. For example, in one embodiment, it is possible to do an emulation of an entire Class B network (e.g. more than 60,000 computers) with only about 60 computers and a set of associated networking hardware and control software. Such an emulation/deception according to the invention is very accurate and behaves very much like an actual network of this size would behave, with the exception that the total aggregate computing performance is far less than that of an actual network of this size. This is an unavoidable side effect of having fewer computers available and operating at a lower cost, however, for a vast range of deception and emulation purposes, this method is as good as having the larger system, and in many ways it is far better. Some of the advantages are the ability to control the network much more easily, higher availability because of the reduction in hardware, lower cost, power consumption, space utilization, and so forth. This method also provides very high signal to noise ratios of intrusion detection, high speed adaptation to changing circumstances in the environment, and can be used to do testing and emulation of a wide range of network attack and defense methods with results equivalent to that of a real network.

A further understanding of the invention can be had from the detailed discussion of specific embodiments below. For purposes of clarity, this discussion refers to devices, methods, and concepts in terms of specific examples. However, the method of the present invention may operate with a wide variety of types of communication systems and logic systems. It is therefore intended that the invention not be limited except as provided in the attached claims. Furthermore, it is well known in the art that logic systems can include a wide variety of different components and different functions in a modular fashion. Different embodiments of a system can include different mixtures of elements and functions and may group various functions as parts of various elements.

For purposes of clarity, the invention is described in terms of systems that include many different innovative components and innovative combinations of components. No inference should be taken to limit the invention to combinations containing all of the innovative components listed in any illustrative embodiment in this specification.

The invention as described herein at times refers to transmission of various packets, datagrams, PDU's or data units of data. These terms should be understood as generally equivalent and indicate any known format for exchanging data with address indications.

Furthermore, for purposes of clarity, aspects of the invention are at times described with reference to a deception system. As discussed herein, this should be understood as a specific example, and the invention has other applications, such as emulation systems, redirection systems, analysis systems, or systems to create extended private networks.

All publications, patents, and patent applications cited herein are hereby incorporated by reference in their entirety for all purposes. The invention will be better understood with reference to the following drawings and detailed description.

BRIEF DESCRIPTION OF THE DRAWINGS

FIG. 1C is a block diagram illustrating a front-end/back-end firewall system as known in the prior art.

FIG. 4B is a block diagram illustrating multiple address translations, according to one embodiment of the present invention, that can allow deception networks to be separated from normal networks and can further allow "real" emulation systems to replace lower fidelity deceptions and that further can allow increased indirection and obscurity.

FIG. 4C is a block diagram illustrating multiple address translations, according to one embodiment of the present invention, and providing further details according to specific embodiments.

DESCRIPTION OF SPECIFIC EMBODIMENTS

Single Address Deception Tool Kit

A consideration of the present inventor's work as embodied in early versions of Deception ToolKit (DTK) (http://all.net/dtk/dtk.html) will aid in understanding the present discussion. DTK is at present a publicly available off-the-shelf deception system. DTK is designed primarily to provide the average Internet user with a way to turn on a set of deceptions in a few minutes that will be effective in substantially increasing attacker workloads while reducing defender workloads. Various functions and aspects of DTK have been made available at the inventor's website in an incremental fashion.

Figure 2:
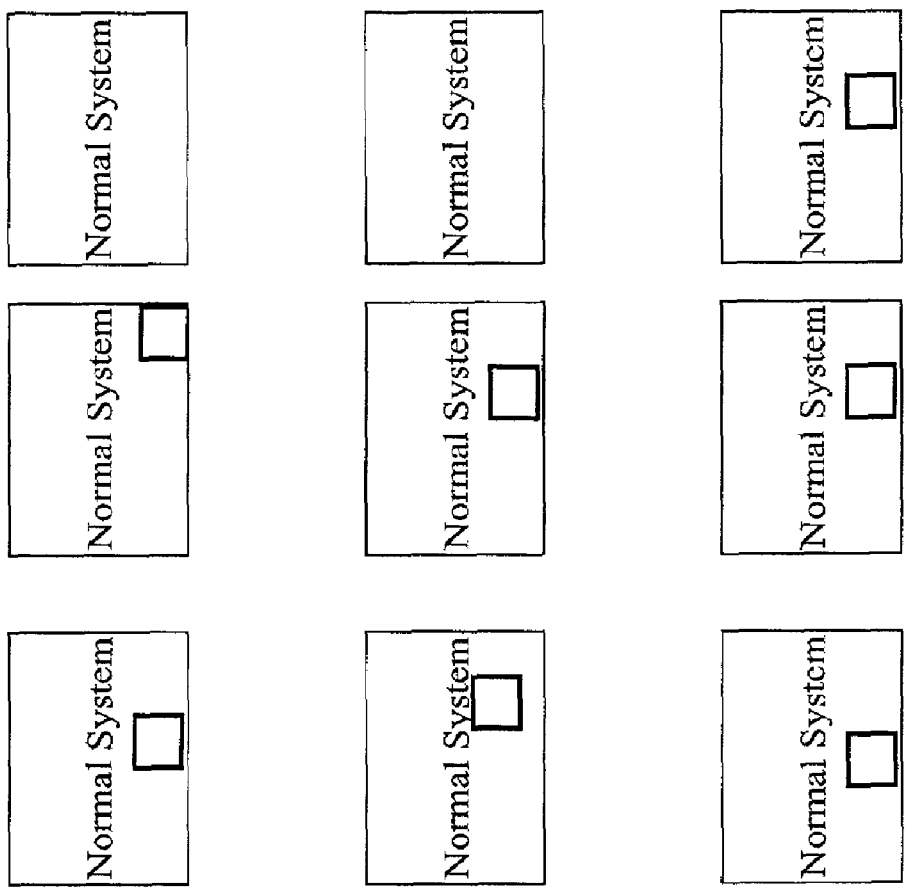
FIG. 2 is a block diagram illustrating a deployment of an early version of a deception tool kit in individual computer systems, with each deployment providing deception services at a single computer system.

In its early-version off-the-shelf form, DTK is designed to be installed on one or more single machines on a network and provide fictions that are adequate to fool current off-the-shelf automated attack tools. FIG. 2 is a block diagram illustrating a deployment of an early version of a deception tool kit in individual computer systems, with each deployment providing deception services at a single computer system. As will be understood in the art from the teachings herein, FIG. 2 represents a number of actual computers on a network, such as a LAN, that may be vulnerable to attack. Seven of the computers are shown containing a DTK module. The net effect is that attack tools that automatically scan for known vulnerabilities (such as in the LAN computers shown in FIG. 2) find what appear to be large volumes of vulnerabilities. The number of detected vulnerabilities is very high and dominated by deceptions. The attacker is faced with spending additional time and effort trying to figure out which of the indicated attacks really work on that machine. At the same time, all of the attack attempts against deceptions are revealed to the defender.

DTK's deception is programmable, but it is typically limited to producing output in response to attacker input in such a way as to simulate the behavior of a system that is vulnerable to the attackers' method. As a programmable deception capability, DTK provides a low-cost method for a defender to create custom deceptions of arbitrary complexity. For example, it is a fairly simple matter to create a series of convincing electronic mail messages that indicate a false intent to an attacker. If the attacker is clever enough to break into the pop3 email server deception using known attack techniques, they are provided with false and planted information. DTK is not intended to be the end-all to deceptions in information systems. It is only a simple tool for creating deceptions that fool simplistic attacks, defeat some automatic attack systems, and change the balance of workload in favor of the defender.

A simplistic view of deception for the purposes of analysis is that out of a few thousand widely known possible vulnerabilities in modern information systems, most current systems are only vulnerable to a small percentage of them, if only because most modern system don't use most of the capabilities of their systems for useful applications. If an attacker does not observe traffic before trying to test the defenses, and assuming that access attempts are not concentrated more on actual services provided than on deceptive services, every attempted access has a high probability of triggering a deception rather than an actual service.

In addition to causing an increase in the attacker's workload, a DTK system has a further pleasant effect for the defender: every miss by the attacker represents a detection by the defender. This means that defenders, instead of ignoring unused services, are alerted to all of the failed attempts. With deception in place, every use of a deceptive service constitutes the detection of an attempted attack. In general, there are two problems for the designer of automated attacks against deceptive defenses such as those demonstrated in DTK. The first problem is generating automation that differentiates between deceptions and real services. The second problem is finding a way to succeed in the attack before the defender is able to react.

While the problem of differentiating deception from reality is, in general, a very complex problem equivalent to the general problem of finite state machine differentiation, the realities of DTK today limit its deceptions to relatively simple state machines. Since the attacker has access to the most widely used deceptions in the same manner as the defenders, writing differentiation routines for complex services should be simple, while writing differentiation routines for simple services may be impossible. In essence, the more complex the deception requirement, the harder it is to make a good deception, and thus the easier it is to differentiate real systems from limited deceptions. On the other hand, simple systems such as pop3 servers are so simple to build that a deception can be built easily that completely and precisely mimics the real service. The much harder problem is defeating deception by moving so quickly that the decision cycle of the defender cannot block the attack. In normal systems without deception, the attacker has a long time before detection takes place. With deception in place, every attempt to use a deception service can generate an immediate detection. With automated notification and response procedures are in place for each detected attack attempt, the attacker may have to succeed in a matter of milliseconds to prevent the defender from acting.

DTK responding from a single address has been used in experiments and in beta test systems since early in 1998. Early versions of DTK were implemented as a Perl script. The use of common (i.e., shared) code segments by all invocations of Perl on a given system combined with the small size and quantity of state information required in order to implement DTK's finite state response services produces a relatively small performance and memory impact on systems, and essentially no effect when attacks are not underway. In experiments with common denial of service attacks, it was found that DTK was able to sustain operations when the normal service daemons that are attacked in typical denial of service attacks were susceptible.

DTK was designed with the intention of being resilient to resource exhaustion attacks by including timeouts and input length limitations that most normal service programs do not have—to their detriment. DTK uses the same methods as the secure Get-only Web server to provide additional protection in a secure daemon. DTK has a tremendous advantage in that it is able to closely control events on deception services, while the typical intrusion detection system has to merely watch an essentially unrestricted flow of information. DTK thus significantly improves the signal to noise ratio for detection.

Port 365

If DTK becomes very widespread, one of DTK's deceptions will become very effective. This deception is IP port 365—which has staked a claim as the deception port. Port 365 indicates whether a machine is running a deception defense. Naturally, attackers who wish to avoid deceptive defenses will check there first. Eventually, simply running the deception defense notifier may eliminate many attackers. Of course, some defenders may turn on the deception announcement message in order to track new attack attempts.

Deception port 365 has also been used to facilitate two kinds of enhancements. One form of enhancement is to provide a means for remotely accessing log information in order to centralize intrusion management. In this way, fully decentralized deceptions can be implemented in a large network with remote reporting and control. Of course this remote control has to have proper protections to prevent it from being exploited by attackers. The details of these protocols is well within the classes of existing cryptographic protocols used for intrusion detection and remote network management systems.

Another enhanced use of the deception port is communication between deception systems to coordinate defensive efforts. In an experimental system, deception systems communicate with other deception systems engaged in related business functions. They independently schedule deceptions to increase and replace non-critical functions as detected attacks increase, decrease deceptions and enhance non-critical functions as attacks decrease, and pseudo-randomly insert and alter deceptions during times of low-level activity so as to make it impossible for even the expert insider who set up deception to be certain of going undetected. This can be done in a fully distributed, automatic, and hard-to-predict fashion while still being forced by mathematical methods to meet operational constraints and consuming very small amounts of time and space and operating on heterogeneous networks.

One other area of deception has been experimented with are internal deceptions wherein programs that could be used to gain unauthorized access once inside a system are instrumented and augmented to include deceptions. For example, if an unauthorized Unix user attempts to use the Unix su command, a deception is used to allow the root password to be easily guessed. The user is then placed in a jail-like enclosure to allow any attempts at further access or exploitation of illicit access to be observed, analyzed, and recorded. This type of deception is significantly complicated by the large volume of information that is legitimately provided to most internal users.

Multiple Address Deceptions

Figure 3:
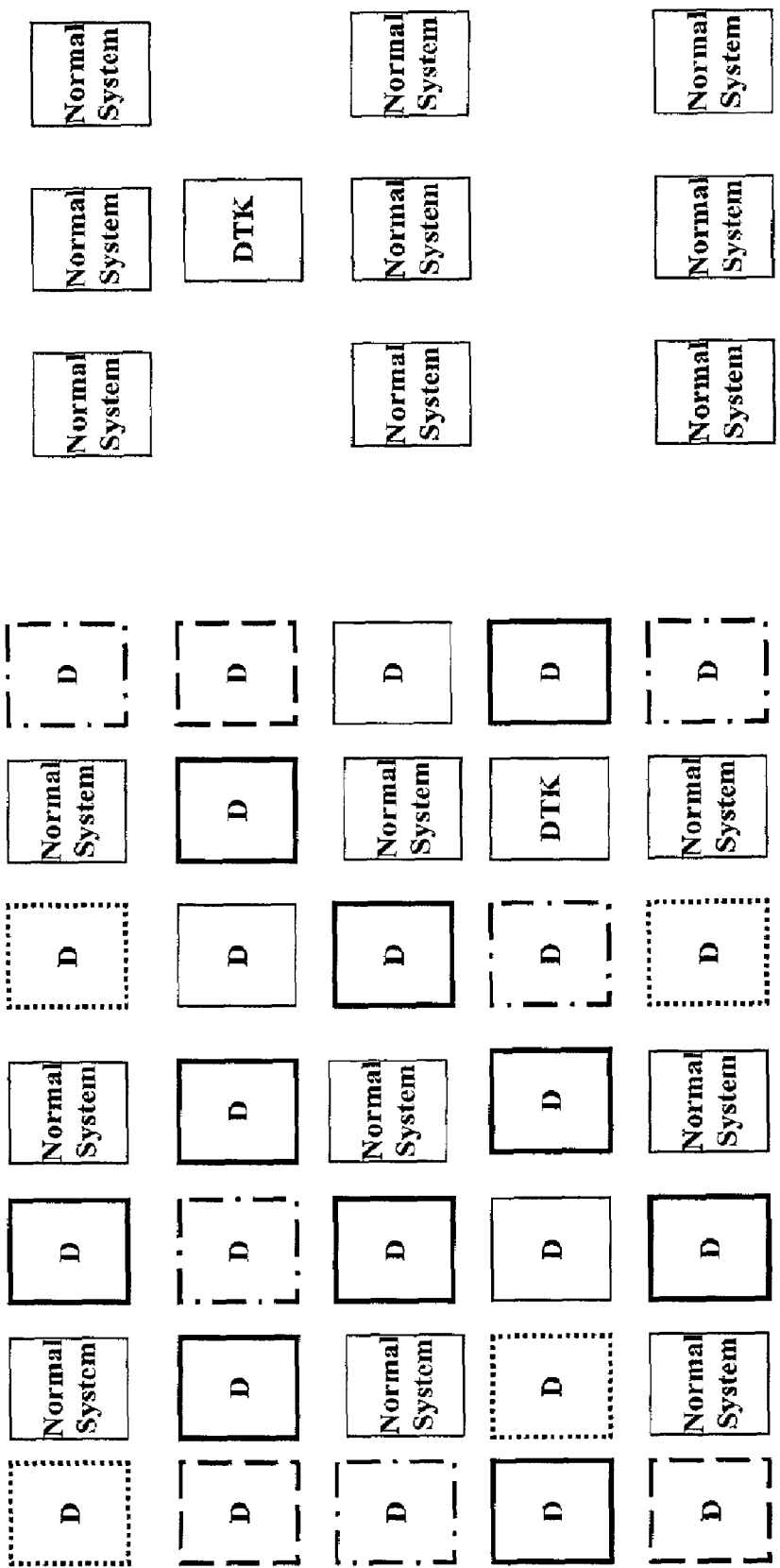
FIG. 3 is a block diagram showing a deployment of an advanced Deception Tool Kit within a network, according to one embodiment of the present invention, with the Deception Tool Kit providing deceptive services at multiple addresses.

A more advanced deception against attacks can be provided according to specific embodiments of the invention as illustrated in FIG. 3. FIG. 3 is a block diagram showing a deployment of an advanced Deception Tool Kit within a network, according to one embodiment of the present invention, with the Deception Tool Kit providing deceptive services at multiple addresses. Illustrated on the right of FIG. 3 is the "real" configuration of network equipment. FIG. 3 illustrates nine "normal" systems in a communications network that the invention wishes to protect from attacks. These nine systems can be understood as perhaps individually addressable computers on a local area network (LAN) that might be subject to attack, perhaps through a firewall or gateway, or from an attacker with direct access to the inside network. To protect these systems, one or more deception modules or machines (labeled DTK) is placed in the network. This module might be a software module running on a computer system on the network, or it might be a separate piece of hardware dedicated to providing deceptions. According to specific embodiments of the present invention, the deception system DTK responds to some or all illegitimate or unauthorized packets that enter the network with deceptions.

For example, suppose the nine "normal" systems responded at nine addresses that were non-zero multiples of six, such as 10.0.0.6, 10.0.0.12, 10.0.0.18, etc. An attacker that had gained access to the inside network without knowing the existing addresses, might attempt to discover valid internal addresses at random. In a network not using the invention, the attacker might first attempt addresses 10.0.0.0-5 and each time he did not get a valid response, the attacker would turn to the next address.

According to specific embodiments of the present invention, however, as illustrated in FIG. 3, an attacker would get a response at one or more addresses 10.0.0.0-5. These responses, however, would all be generated by deception component DTK. Deception component DTK, depending on its capabilities, can provide rather elaborate deceptions that varied for each incoming IP address and that varied over time. Thus, an attacker could be led to waste a large amount of time breaking in to deception systems and risking detection.

As will be understood to those of skill in the art from the teachings herein and the illustration in FIG. 3, unauthorized packets can reach the DTK device in a number of ways consistent with standard networking techniques. For example, where the devices shown to the right of FIG. 3 all reside on a Local Area Network (LAN), DTK can be programmed to simply respond to every packet addressed to a destination that is not active on the network. An advanced DTK can also sniff every packet, and respond to every packet that does not meet a predefined authorization characteristic, such as having a particular key.

It will also be understood to those of skill in the art from the teachings herein, that the techniques illustrated in FIG. 2 and in FIG. 3 could be used in the same network. Thus, packets that reached a normal system with an unauthorized service request could be responded to by a deception module at that normal system, while packets addressed to unauthorized destinations could be handled by a multiple address DTK as illustrated in FIG. 3.

Figure 9:
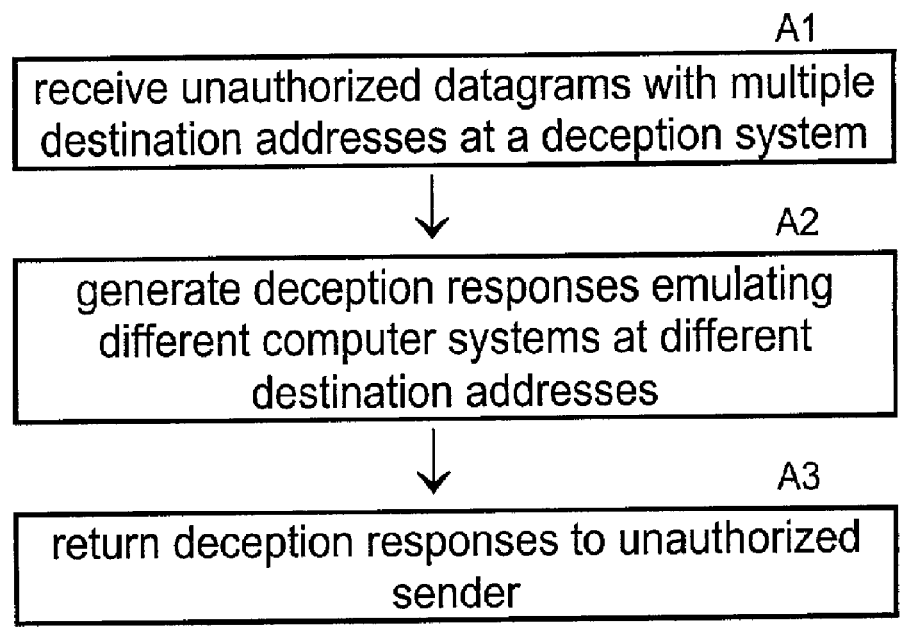
FIG. 9 is a flowchart illustrating a method for providing deception/emulation responses according to embodiments of the present invention.

FIG. 9 is a flowchart illustrating a method for providing deception/emulation responses according to these embodiments of the present invention. As shown in the figure, unauthorized packets to various destination addresses are received at a deception system in a network and the deception system generates deception responses emulating different computer systems at different destination addresses and returns deception responses to the unauthorized senders so that the senders will be deceived to believe they have reached different systems.

Deception Tool Kit Limitations

DTK as shown in both FIG. 3 and FIG. 2 is limited in the richness of the deceptions it can provide. It is simple to differentiate between a real computing environment and the limited capabilities demonstrated by a finite state machine having only a small number of states. However, against many modern automated attack tools, even this limited deception is adequate.

For a serious attacker, differentiation even by an automated tool may be a simple matter. For example, an attacker may pseudo-randomly select a series of commands from a normal environment, run them on a local machine, and compare results to those of the same commands run against a machine under attack. Differences would indicate possible deceptions. A sophisticated attacker could break into an intermediate site, test the site under attack for deception, differentiate deception services from legitimate services, and then exploit the legitimate services from a different location. This type of distributed coordinated attack (DCA) can render the sort of limited deceptions provided by DTK less effective.

DTK provides a limited unlimited customization capability. It is unlimited in that, theoretically, a deception module can simulate anything that a Turing machine can do with finite state machines and unlimited memory; in practice, however, the deception is limited by the ability of customization to adequately deceive. A good example is a simulated mail server: while it can be easily programmed to provide access to forged email, generating a sequence of meaningful forged emails to create a deception is not such a simple task.

Enhanced Emulation/Deception Using Multiple Actual Logic Systems

In further aspects, the present invention provides a method and system for more complex and sophisticated deceptions and emulations. It will be understood to those of skill in the art that the concept of emulation and deception are related. The purpose of an emulation is to act as if it were the real thing for the intended purposes even though it is not in fact the real thing. The purpose of a deception is to convince an attacker that an attacked target is the desired target even though the attacked target is not in fact the desired target. The present invention, in various aspects, is related to apparatus and methods that are useful for both deception and emulation and to other apparatus and methods useful in advanced digital communications. As used herein, deception and emulation can be understood to describe essentially the same functionality, though for different purposes.

Figure 1A:
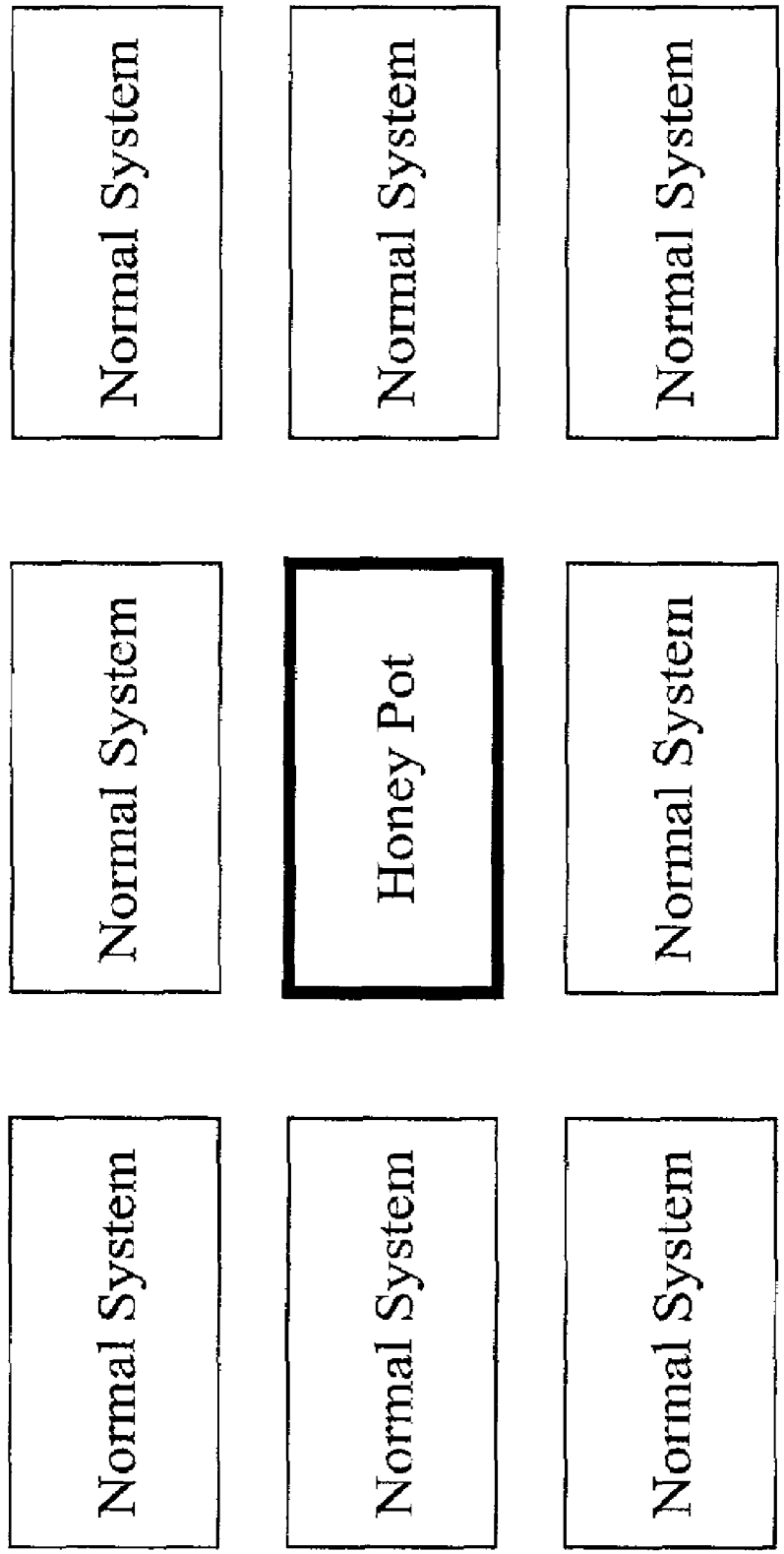
FIG. 1A is a block diagram illustrating a honey pot system within a local area network as known in the prior art.
Figure 1B:
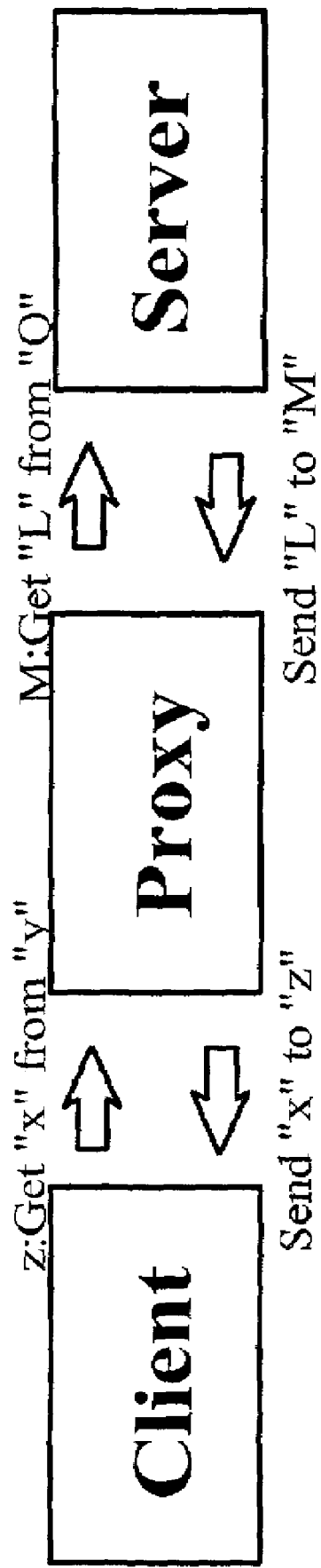
FIG. 1B is a block diagram illustrating address translations between a first client network and a second server network using a proxy server as known in the prior art.

Other network emulation and deception systems, such as network simulators, early versions of DTK, various hardware emulation mechanisms, and honey pot systems, have a number of limitations. They are only able to do high quality deceptions of a single system with a single system at one time. This is true of both normal honey-pot systems as shown in FIG. 1A and early versions of DTK as shown in FIG. 2. Network simulators are able to simulate large scale networks, but do so at resolution limited by the model upon which their simulations are based.

Furthermore, the fidelity of deceptions is relatively poor. This is true primarily of early versions of Deception ToolKit, which traded off low cost and low system utilization for poor fidelity. Other network simulation technologies may do a good job at emulating some facets of the networked environment, but because they require explicit modeling of simulated components, their fidelity is limited except in the aspects they are specifically designed to elucidate. One of the exceptions to this is a set of systems that provide virtual machine environments. In this case, the emulations are very good but consume a lot of performance and are not scalable beyond a few emulated systems per host system. Further information regarding deceptions of this sort are documented in all.net/journal/ntb/deception.html, portions of which are included herein.

In part to address these limitations, the present invention in specific embodiments provides a method for emulating a network of logic systems of at least two distinct types (such as two different operating systems or two different hardware platforms). According to this aspect of the invention, the emulations generally are done by actual logic systems that are particularly appropriate for running those emulations. A communication channel to the actual logic systems can distribute datagrams that are having their responses emulated so that datagrams wind up at the appropriate emulation system. Typically, each emulation system will respond to multiple addresses to emulate multiple systems. If the desired emulated network, for example, included 23 Sun Apache servers and 13 NT Servers, in the emulation network, a single Sun Apache Server might be used to respond to the 23 Apache addresses and a single NT server might be used to respond to the NT addresses. To improve the network-wide emulation, at least one of the emulation systems may provide variant response characteristics. Variations can be based on the incoming emulated address, to provide the emulation of different instances of the computer type in the network and can include such things as time and use characteristics. The network configuration and individual responses of the emulations can also be altered over time to emulate the characteristics of real networks.

To allow for sophisticated variation, in specific embodiments, emulation of various machines can be controllable from one or more control systems. A control system, for example, can operate much as a network administration system on a real network, and can start and stop various emulations, change operating characteristics and network response characteristics of various emulations, and/or change the routing to various emulation systems to change the perceived topology of the network.

These techniques can be used to provide deception in a communication network by responding to received datagrams using different deception emulations so that a receiver believes a number of different units have been reached. This can be accomplished by routing datagrams addressed to non-existing computers or non-available services to a deception system and responding to said datagrams using varying emulations. For the deceptions, emulations can vary based on one or more of: datagram addresses, time, or usage characteristics.

This technique can be implemented in a simplified way by including two DTK systems of different types in the system shown in FIG. 3, and programming those systems so that each responds to a different set of unauthorized addresses, with different emulations. This deception can be performed in a more sophisticated manner using an emulation subnetwork as described below.

Figure 10:
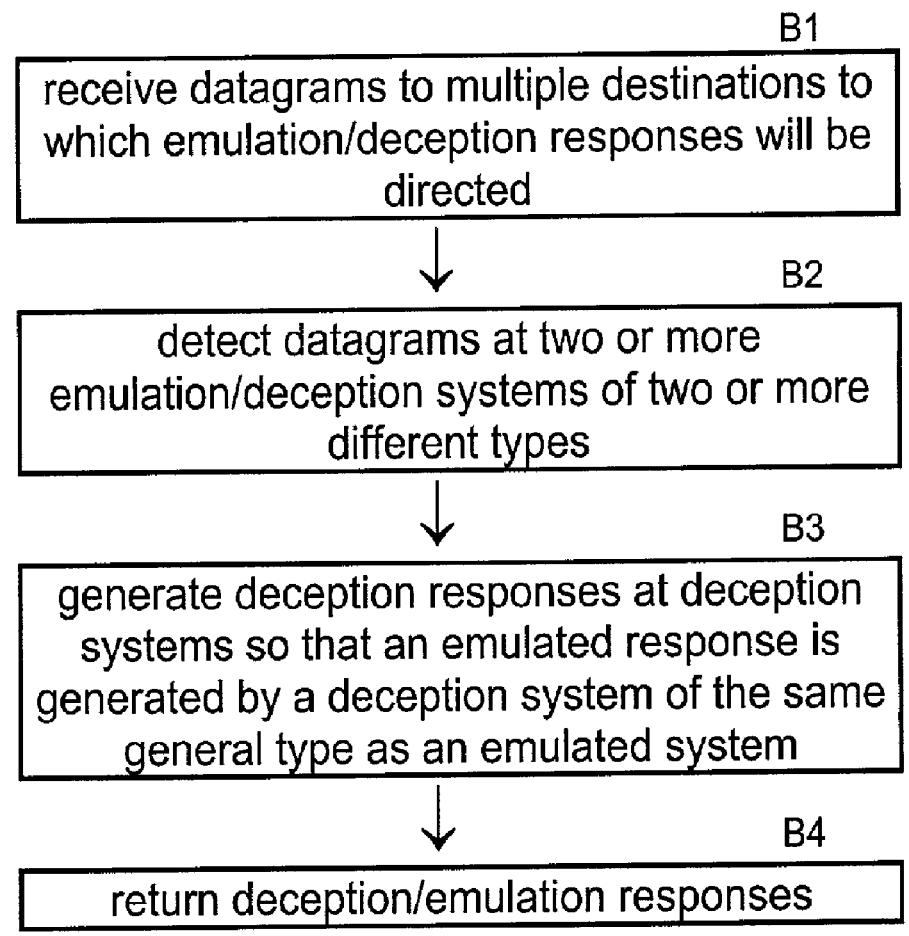
FIG. 10 is a flowchart illustrating a method for providing deception/emulation responses from multiple emulation systems according to embodiments of the present invention.

FIG. 10 is a flowchart illustrating a method for providing deception/emulation responses from multiple emulation systems according to embodiments of the present invention. As shown in this example method, datagrams to multiple destinations to are detected (or may be directed on a network in specific embodiments) at two or more emulation/deception systems of two or more different types and responses are generated by a deception system of the same general type as the system being emulated.

Emulation Subnetworks

Figure 4A:
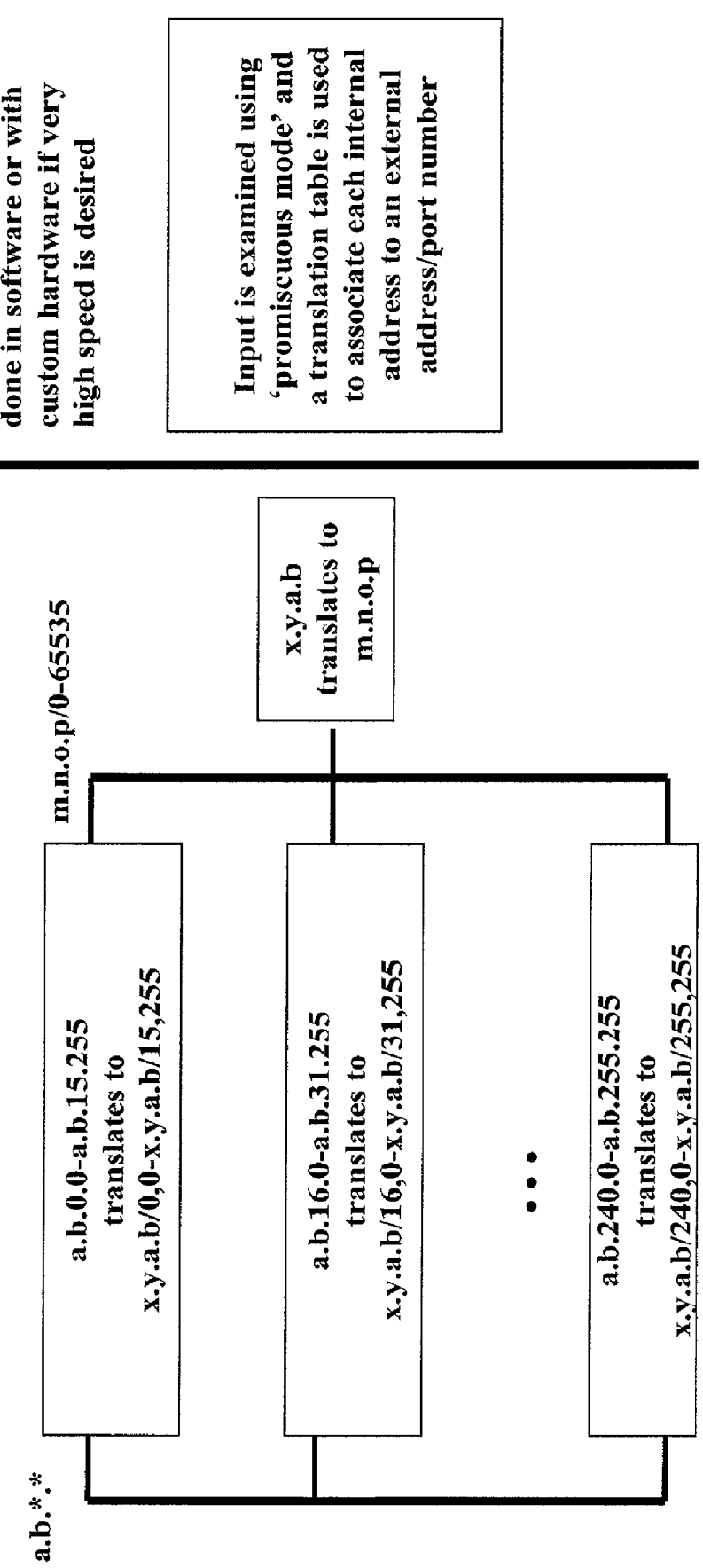
FIG. 4A is a block diagram illustrating two examples of address translations, according to specific embodiments of the present invention.

In further embodiments, the invention provides a method for connecting an emulation subnetwork to a network using address translation. FIG. 4A is a block diagram illustrating two examples of address translations, according to specific embodiments of the present invention. Address translation can also be understood as employing an emulation wall, where the emulation wall is a system or device that can receiving datagrams from an outside network, determine that a datagram should be handled in an emulation subnetwork and pass the datagram into the emulation subnetwork with the original addressing it had in the outside network.

In one embodiment, this function could be handled by a specially programmed network device that was able to internally distinguish datagrams (or packets) addressed on the two networks. However, in further embodiments, the invention provides a technique for operating an emulation wall using standard network devices, by using proxy addressing. In this embodiment, packets entering the emulation wall have their original addressing translated into a proxy address while in the emulation wall and then have the proxy address translated back into the original address when the datagrams exit the other side of the emulation wall into the emulation subnetwork. The datagrams can then be routed in the emulation subnetwork using their original addresses, allowing for sophisticated emulation/deception using multiple different emulation machines.

In the reverse direction, a response received at the emulation has its address translated back to a proxy address then passed into an outside network from the emulation subnetwork while the proxy address is translated back into the original address.

Thus, the invention provides a method for deception in a computer network, that includes passing a datagram received with a non-legitimate identifier (such as address, port, or improper characteristics) IP into enters a deception network, rather than encountering a normal user system.

Figure 11:
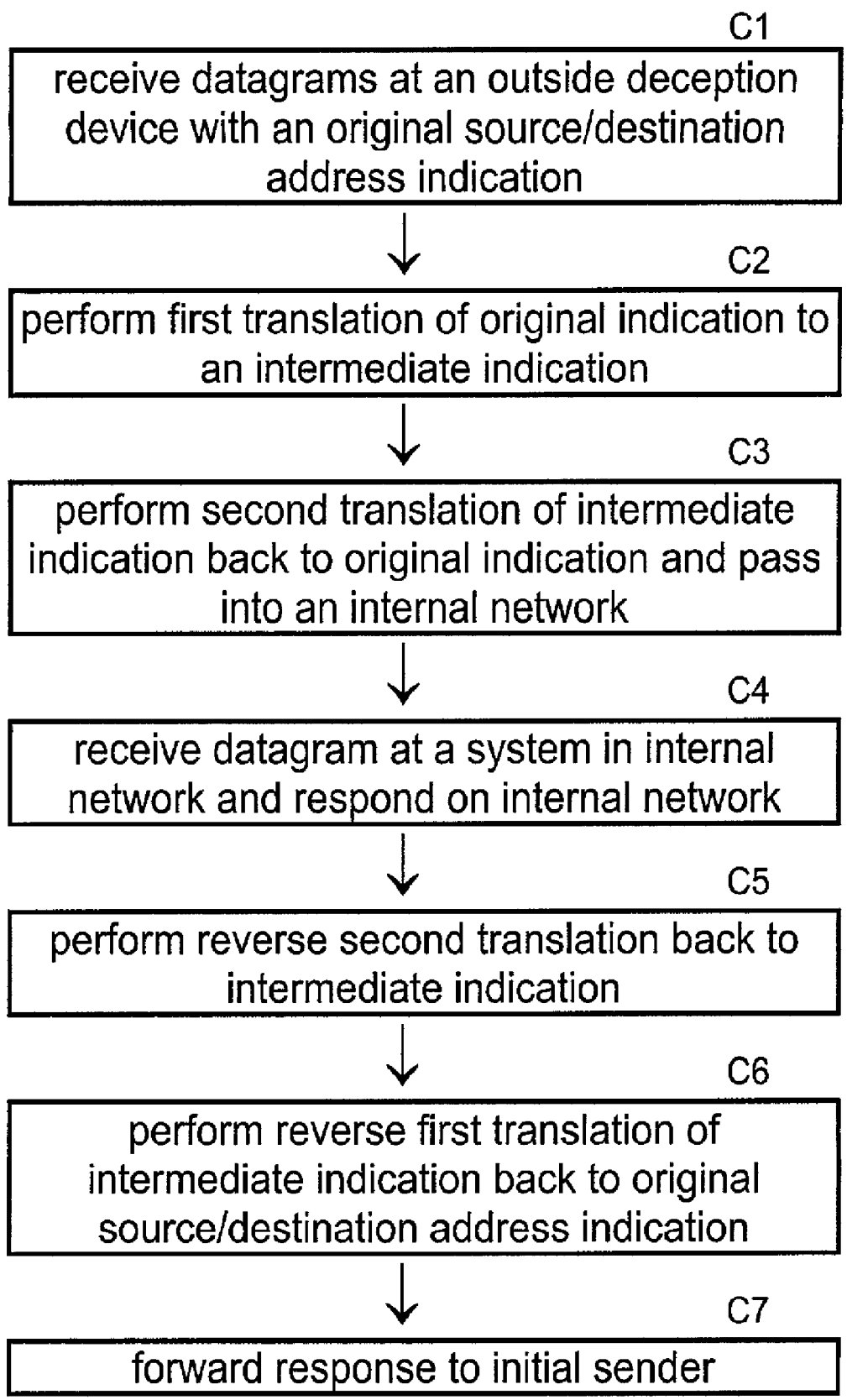
FIG. 11 is a flowchart illustrating a method for using multiple translations to an internal network according to embodiments of the present invention.

FIG. 11 is a flowchart illustrating a method for using multiple translations to an internal network according to embodiments of the present invention.

Larger Scale Example

FIG. 4B is a block diagram illustrating multiple address translations, according to one embodiment of the present invention, that can allow deception networks to be separated from normal networks and can further allow "real" emulation systems to replace lower fidelity deceptions and that farther can allow increased indirection and obscurity.

FIG. 4B shows a larger scale example that was experimentally implemented to create a large-scale deception mechanism covering 40,000 IP addresses. In this example, external traffic can enter the network from the Internet (e.g., from w.x.y.z to a.b.c.d and from m.n.o.p to a.b.c.g) and internal traffic can go from system to system (e.g., from a.b.c.g to a.b.c.f).

In this example, there is no legitimate IP address a.b.c.d, so all traffic directed to that IP address (e.g. w.x.y.z to a.b.c.d as illustrated) is routed into and enters the deception network rather than encountering a normal user system. From the deception network, three things can happen. (1) If the controlling system has established rules indicating the datagram is something to be ignored, the datagram is dropped. (2) If the datagram can be handled at the initial deception system interface, it is, thus datagrams such as Internet Control Message Protocol (ICMP) messages can be responded to from the initial deception network location and the datagram does not encounter the deception system. (3) If the datagram is to be passed into the more detailed deception, it is translated by way of a proxy or other translation means into an internal source address (such as 10.x.y.z on port w*256+n, where n indicates the desired service number to directed to the outside system). In this example, it is assumed that the incoming port/service number only requires one-byte of storage and that the internal packets allow two bytes for port numbers.

After this translation, from the initial proxy system, that datagram is routed in the internal deception system and eventually reaches a second proxy service. This service translates the source address back to original source address and the destination address back to the original destination address. In different implementations, different address translation mechanisms, such as discussed above, can be used.

This second translation makes the datagram on the 'inside' identical to the one that arrived on the 'outside'. The "Real system" (i.e. the actual emulation/deception computer systems) assigned to a.b.c.d within the deception/emulation network then handles the datagram exactly as if it were in the 'outside' part of the network. Responses are sent back through the proxy systems using the reverse of the translation process. In this way, even if the "real" emulation/deception computer system is broken into, the damage is limited to the deception systems. From there, an attacker could try to attack other IP addresses in the defender's network, but all of these attempts will be launched against other systems in the deception network, rather than the systems in the "outside" network. Any activities reaching the deception network systems can be logged and analyzed, and the attacker can be traced back while spending time attacking the deception systems.

Thus, it will be understood from the teachings herein, that FIG. 4B illustrates an example deception/emulation network having four deception systems 20a-d on the outside (10.0.x.x) and four deception systems 22a-d on the inside (10.1.x.x). The figure illustrates three normal systems 10 on the outside network. These normal systems can also include deception components (DT) that are similar to the DTK components described above with reference to FIG. 2. However, these deception modules, unlike with DTK, instead pass unauthorized datagrams into the deception network.

Thus, in a similar way, incoming Internet traffic that is destined for an existing system in the "outside" network (e.g., a.b.c.g) can also be directed into the deception network if the traffic is unauthorized. Unauthorized traffic, as understood in the art, can be determined according to a variety of criteria. For example, by detecting any datagram that attempts to use a service not authorized for external use; by detecting a datagram attempting to use a service not authorized from a particular source address; by detecting any datagram coming from an unauthorized source; etc. An unauthorized datagram can also be a datagram that is in any way not correctly formatted, for example a datagram that does not contain a required key.

According to specific embodiments of the invention, an unauthorized datagram arriving at a normal outside system will be directed by a small proxy address translation mechanism at the normal system into the deception system (e.g., into address a.f.c.g at 20c). From there, the datagram is translated as in the previous example, and handled by the "Real System" in the "Inside" network. Responses are sent back to the "Outside System" and the proxy translation system translates them back so that the outsider (i.e., from m.n.o.p) observes the same behavior that would be encountered if the original system (e.g. a.b.c.g) were handling the request, except that the results are generated by the deception system in the "Inside" network. A break-in will therefore function against the "Inside" network as in the previous example.

According to farther specific embodiments of the invention, if an insider (i.e., from a.b.c.g—whether as a result of a successful break-in to a.b.c.g or from a user of a.b.c.g performing unauthorized activities) attempts to use an unauthorized service from another internal system (i.e., a.b.c.f) this is treated by a.b.c.f in the same manner as in the last example except that the proxy uses a different destination address to indicate to the deception system that this is an insider attack.

Inside the deception network shown in FIG. 4B and FIG. 4C are shown, as examples, actual or "real" emulation/deception computer systems 40p-r), indicating different actual computer systems that can run various emulations/deceptions. The deception network can contain any number of actual systems. The optimal number will vary according to the emulations/deceptions that it is desired to run.

FIG. 4C further illustrates more specifically that a deception system according to specific embodiments of the present invention can involve three network. A first network N1 is the network that is connected to the outside of the outside deception systems 20. The intermediate network N2 represents the communication channel between the outside and inside translation modules. The inside network N3 is a deception/emulation network where packets can be routed to various emulation systems to provide a sophisticated deception, possible using multiple emulation systems 40. Again, according to the invention, the packets flowing in N3 can have identical addressing to packets in the N1 network, thereby allowing for more advanced deceptions.

An optional internal control mechanism 25 is illustrated to indicate that in particular embodiments, control information is provided to components of the system. Control packets or control signals can be directed to systems 20 or 22 by internal module 25 or from an external location to modify or control the translations provided by systems 20 and 22. Control packets can be transmitted according to any mechanism known in the art, such as control protocols including SNMP, etc.

Example Translation/Emulation Application

A prototype built according to a specific embodiment of the invention has been demonstrated capable of providing one or more of secure subnetworks within an internal computing environment. In one implementation, a subnetwork was created and tested out by students in computer security distance learning classes doing laboratory experiments over the Internet. The students were unaware of how many computers were actually in use and how the translations were actually done. They proceeded with the class unaware that less hardware was actually available than they thought was there based on responses received from the network.

Figure 5A:
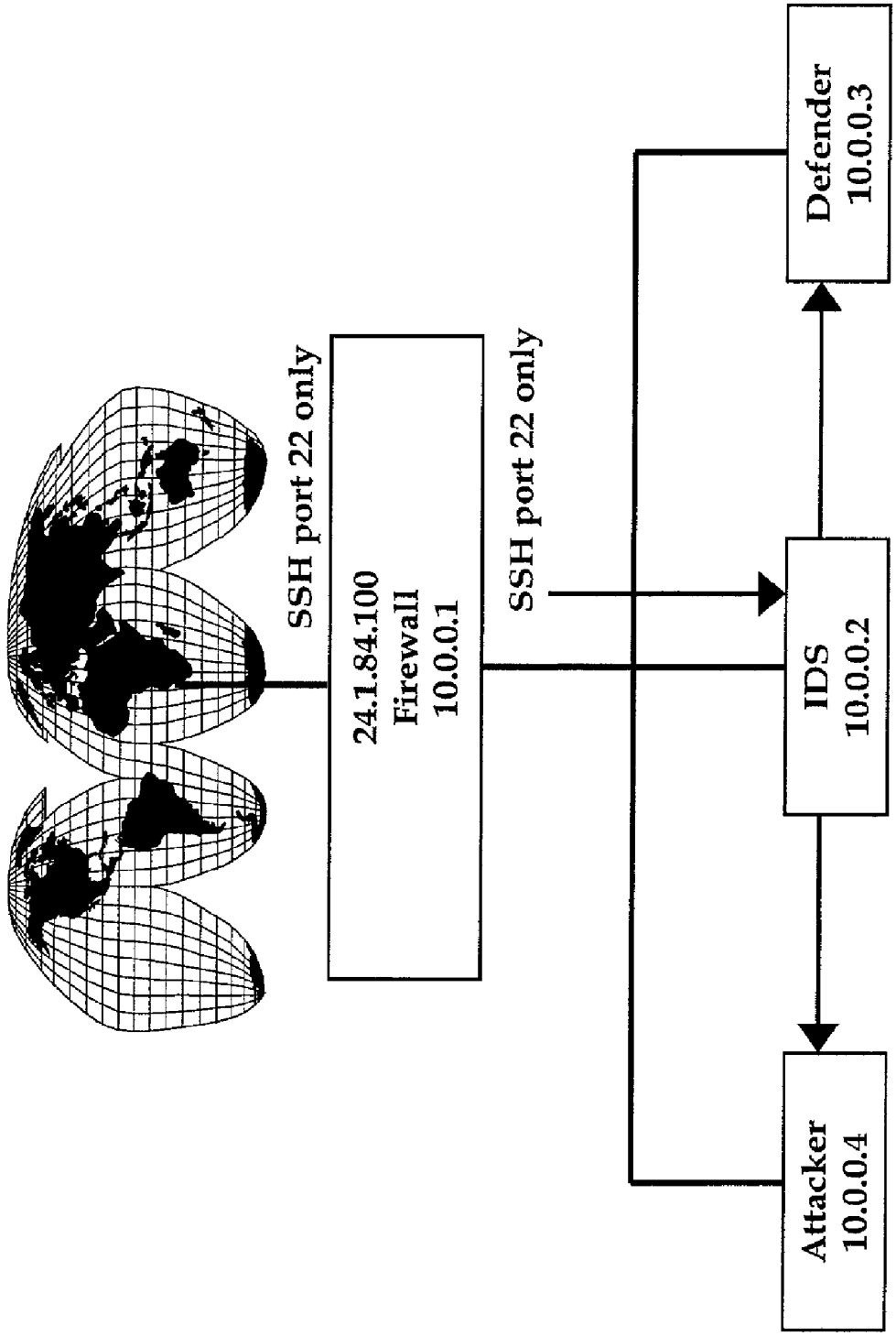
FIG. 5A-C illustrate an example application for the present invention in a student distant learning exercise.
Figure 5B:
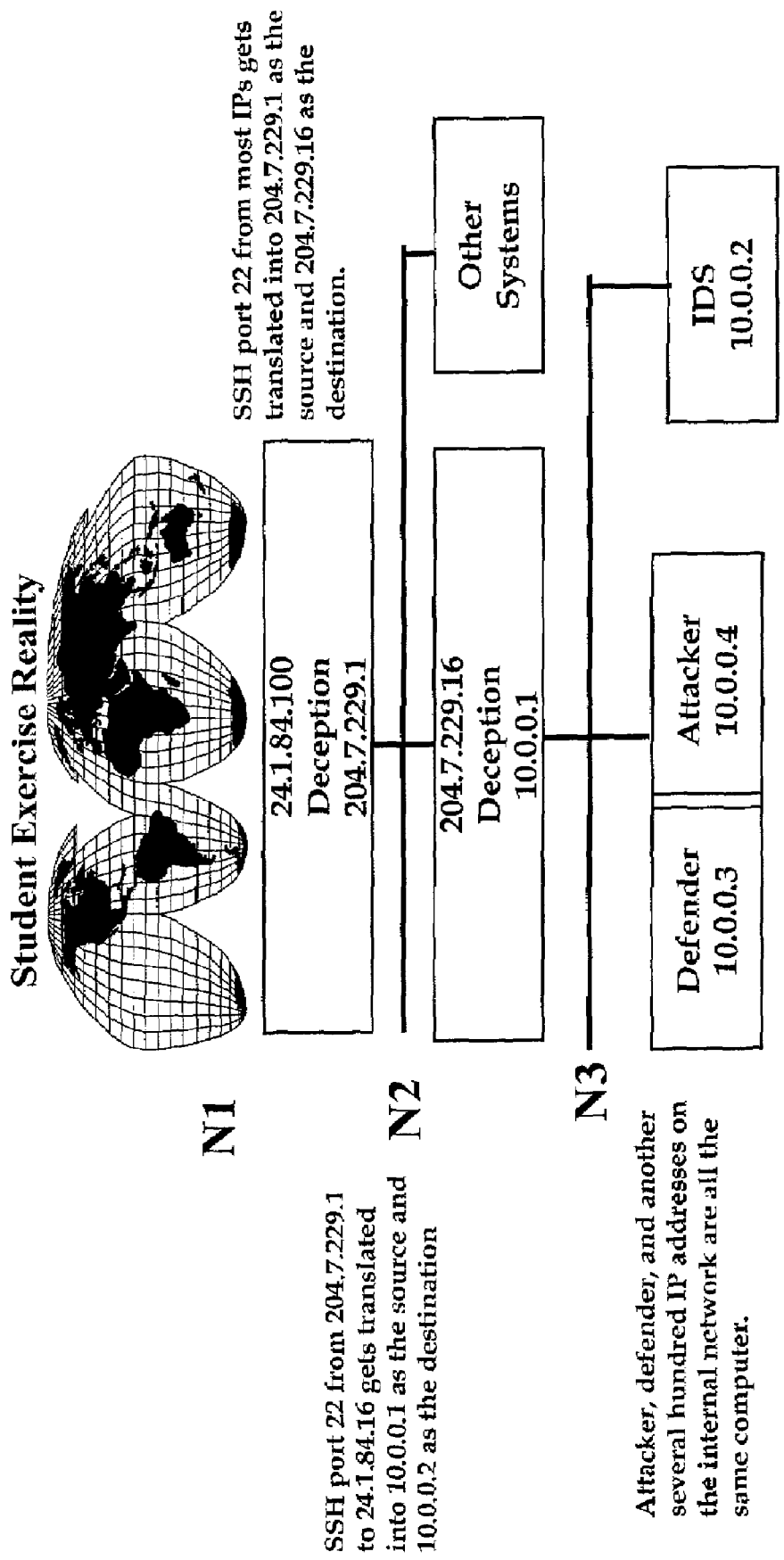
Figure 5C:
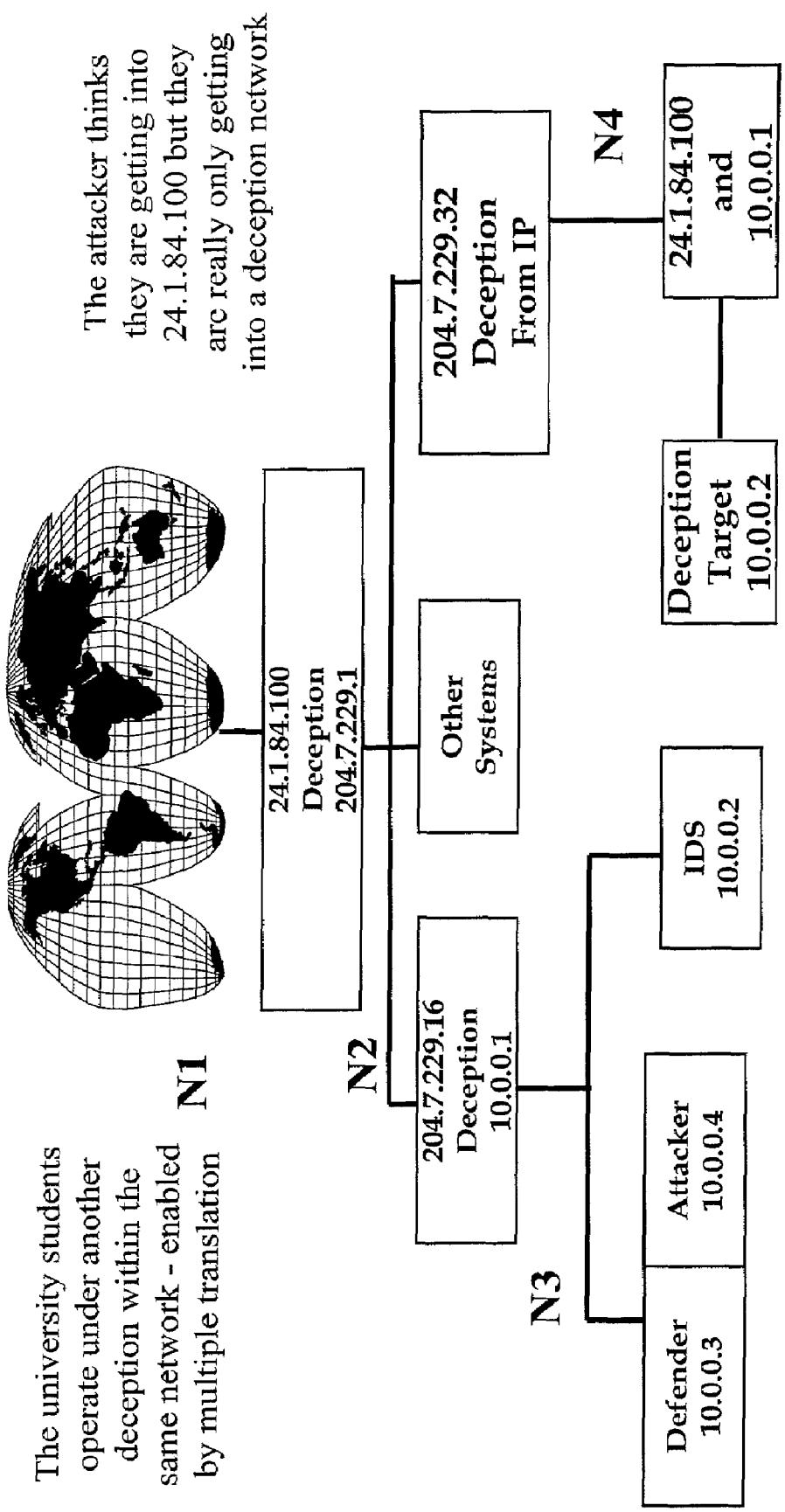

FIG. 5A-C illustrate an example application for the present invention in a student distant learning exercise. FIG. 5A illustrates generally what the students perceived, which was a private network of computers with internal private IP addresses of the form 10.*.*.*. Though only three individual machines are shown, any number of perceived machines could exist within the 10.*.*.* network. (In the figures, the perceived machines are given labels ("Attacker" "Defender" and "IDS") corresponding to roles those perceived machines played in this particular student exercise, but these labels are not important to the present discussion.)

The students also perceived that this private network sat behind a firewall with an external address of 24.1.84.100 and an internal address of 10.0.0.1. This is a common configuration of a LAN connected through a firewall or gateway to the internet. Thus, FIG. 5A illustrates what a student in this example perceives at address 21.1.84.100. The student perceives a standard firewall at that IP address, and behind that firewall, three to 250 systems at local IP addresses 10.0.0.2-4 and 10.0.0.5-255.

In reality, the network configuration shown in FIG. 5A was emulated by the actual network system shown in FIG. 5B. The emulation worked as follows. The students entered the network from wherever they were located, by directing datagrams to an 'outside' address of the deception system (in this example, 24.1.84.100 at the top of FIG. 5B). From there, the student datagram addresses were detected by the first device and translated into a first inside address scheme, for example, in the incoming direction 204.7.229.1 as source and 204.7.229.16 as destination). With this translated address, the packets can be allowed to flow over an intermediate internal network (N2), which in this case may have been an actual LAN or WAN used as a campus network. These datagrams can then flow on the middle network in any way that is convenient and are received at a second deception system where they are translated to 10.0.0.1 as the source and any internal IP address as the destination.

When received by 204.7.229.16 on network N2, the datagrams were then translated into a third addressing system (source 10.0.0.1 and destination 10.*.*.*) for use within an inside deception/emulation network (N3). The original source and destination translation information is preserved within each deception layer using any other translation methods known in the art for firewalls, proxies, or ATG modules.

Within the inside N3 network, there was created an environment that appeared to have more than 250 internal IP addresses operating different versions of Unix and Windows environments. The Unix environments were provided by a small number of PCs running different Unix service sets and doing selective deceptions, while the Windows environments operated using simulated PCs with their own IP addresses.

This method is different from the common technique of using a single server to provide service to multiple IP addresses. In the present invention, the technique uses multiple address translation so that the internal systems are isolated from the rest of the environment and so that the pathways between systems are obscured.

The second source and destination translation in this particular example are also preserved by the second deception system. As indicated in the figure, many different IP addresses can be emulated behind the deception wall. Traffic flowing through the outside network devices into the deception network can be understood as traffic flowing through the network but unable to do anything at computers in that network but flow through them.

It will be further understood that this method allows sophisticated deceptions and emulations using fairly standard network devices configured to perform fairly standard network functions. It is the techniques of the present invention that allows sophisticated emulation/deception without having to build a specialized, high performing, network device that can handle the detecting, translating and emulating functions.

Second Application—Moving External Services into a Protected Network

FIG. 5C shows a further example configuration with a deception student network as described above, and a second deception network or protected network (N4). In other embodiment, the invention using this basic configuration can allow a set of external services that previously operated in the 'outer' network to be moved to a separate 'inner' network so that they can operate securely in the sense that any successful bypassing of the security on the 'inner' systems would not be able to affect other systems in the environment. It would appear to an attacker who took control of these systems that the attacker was connected directly to these systems without going through the deception and that there were no other systems available to attack in this environment. In fact there could be several other networks operating at the same time through different address translation schemes.

In this manner, multiple simultaneous deceptions (N3 and N4) are operable at the same time based on different uses of multiple address translations for deception. This is quite different from the common firewall technique of creating a 'DeMilitarized Zone' (DMZ) for two reasons; (1) previous firewall techniques do not use multiple address translation for deception purposes, and (2) previous firewall techniques do not use this mechanism to emulate large networks by using a small number of computers.

In this example, multiple 'back end' translations are used to create separate deception networks for different applications. In this example, 24.1.84.100, an external actual IP address of an outside network system translates the same services differently for different incoming source addresses, creating for some, the illusion of the University network (N3), for others the illusion of the service system with a vulnerable deception target (N4), and for still others, access to the 'other systems' (N2). This can be extended indefinitely to create arbitrarily complex parallel and sequential translations in order to emulate any number of different situations for any number of different observers and to allow the apparent architecture of the network to change with time or viewpoint just as a large scale computer networks change with time and viewpoint. It can be used, if desired, to redirect traffic of particular types through particular pieces of hardware to provide any desired emulation for each individual or group of access requests.

In experiments, the implementation depicted here has been extended to include five different networks, with as many as five translations required for any given access, and with different apparent architectures seen from each point in the network. This provides practical benefit in that it permits customized access to different user bases to different facilities but with the same instructions and with increased assurance of separation between their uses. It can also successfully misdirect attackers into wasting large amounts of effort breaking into deception targets while the attackers were observed and without affecting services to other elements of the infrastructure.

Other uses of this implementation strategy can include (1) creating secure multiple-hop tunnels between distributed intelligence gathering systems, and (2) creating source address differentiated deceptions allowing specific users to perform systems administration tasks while other users are passed through the transparent address translation mechanism into an internal applications environment.

Figure 12:
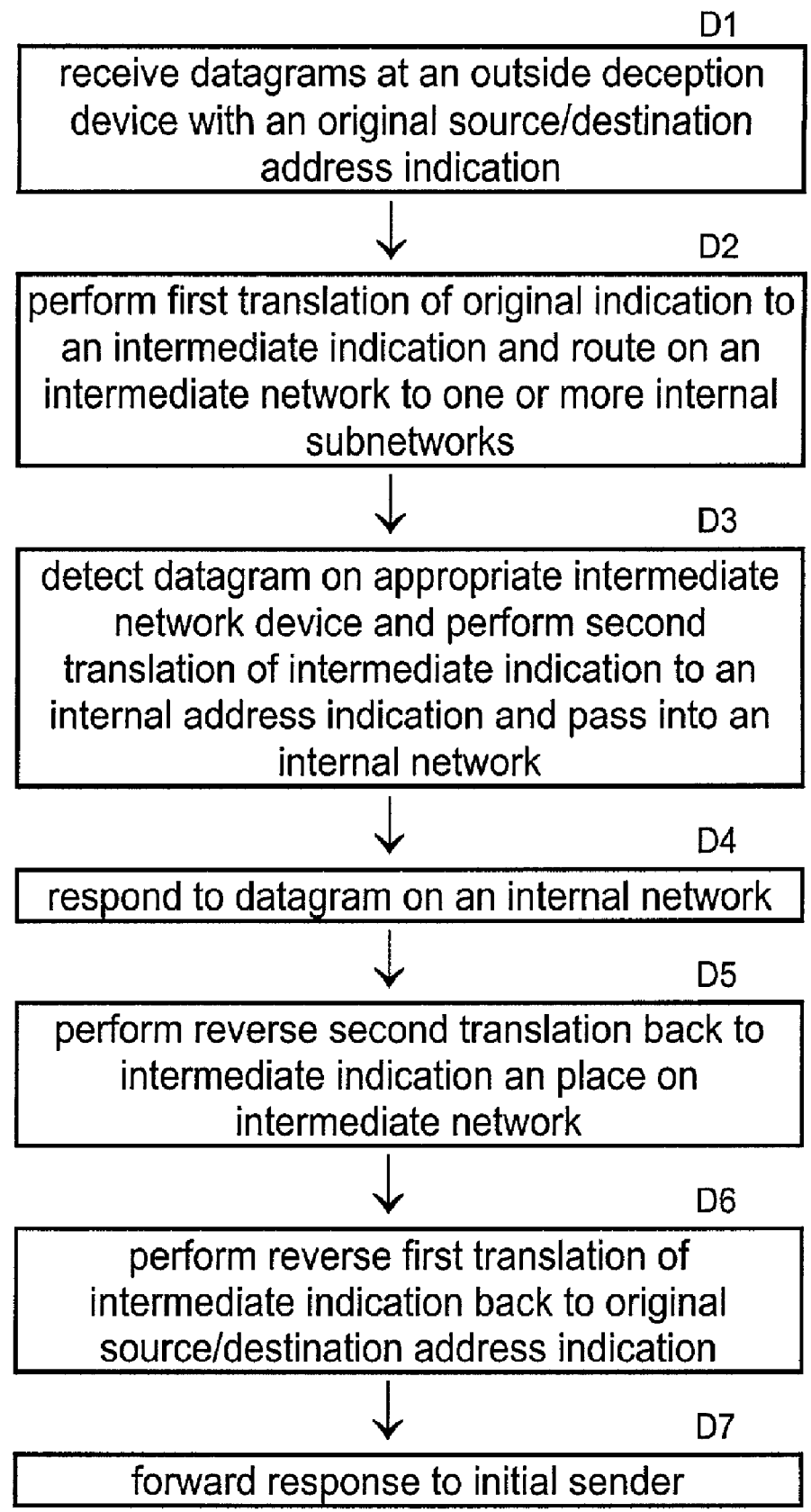
FIG. 12 is a flowchart illustrating a method for directing datagram traffic to a deception/emulation device in a separate internal network according to embodiments of the present invention.

FIG. 12 is a flowchart illustrating a method for directing datagram traffic to a deception/emulation device in a separate internal network according to embodiments of the present invention. In this method according to specific embodiments of the present invention, datagrams are received at an outside deception device with an original source/destination address indication, and a first translation of original indication to an intermediate indication is performed and datagrams are routed on an intermediate network to one or more internal subnetworks. Datagrams are detected on an appropriate intermediate network device that performs a second translation of intermediate indication to an internal address indication. The datagrams are then passed into an internal network, where a response is generated and the process is reversed.

A Further Example Application—Obscuring Requests

A further example application of specific embodiments of the present invention involves larger numbers of address translations. In this case, depending on where the user comes from and what services they attempt to use, the behavior of the network will be completely different. Multiple address translations are used to create the perception that traffic is coming from different locations and via different paths. This is similar to the manner in which 'anonymizer' services operate, and one of the provisions that this process enables includes the creation of anonymity, however, unlike previous anonymizing services, multiple address translation are used to obscure the fact that the request is coming from or through an anonymizing system. This is also different from the so-called 'mixmaster' systems which seek to obscure information by routing requests through multiple hops using cryptographic tunnels. While this architecture can and does use cryptographic tunnels to provide control over traffic observation, the use of multiple address translation is not part of existing mixmaster methods and improves upon their technique by further obscuring the links between traffic patterns and sources and allowing unencrypted and/or non-member traffic to be facilitated along with encrypted traffic. This goal is accomplished by routing requests through different servers and IP addresses on each request or each set of requests.

This technique can effectively aide in a large variety of deception and emulation activities including but not limited to 1) generating desired traffic patterns to test behavior under different loads and access methods, 2) obscuring the connection between requests and requesters, 3) creating different network traffic concentrations on different parts of intervening infrastructure to detect and trace sources of attacks without directly tracing the routes and while avoiding detection of the traceback, 4) gathering intelligence while obscuring its source or use, 5) altering network traffic patterns via reflexive control, and 6) inducing misperceptions in the minds of the people operating services as to the usage patterns and utility of advertisements or similar analysis of traffic patterns.

Figure 6:
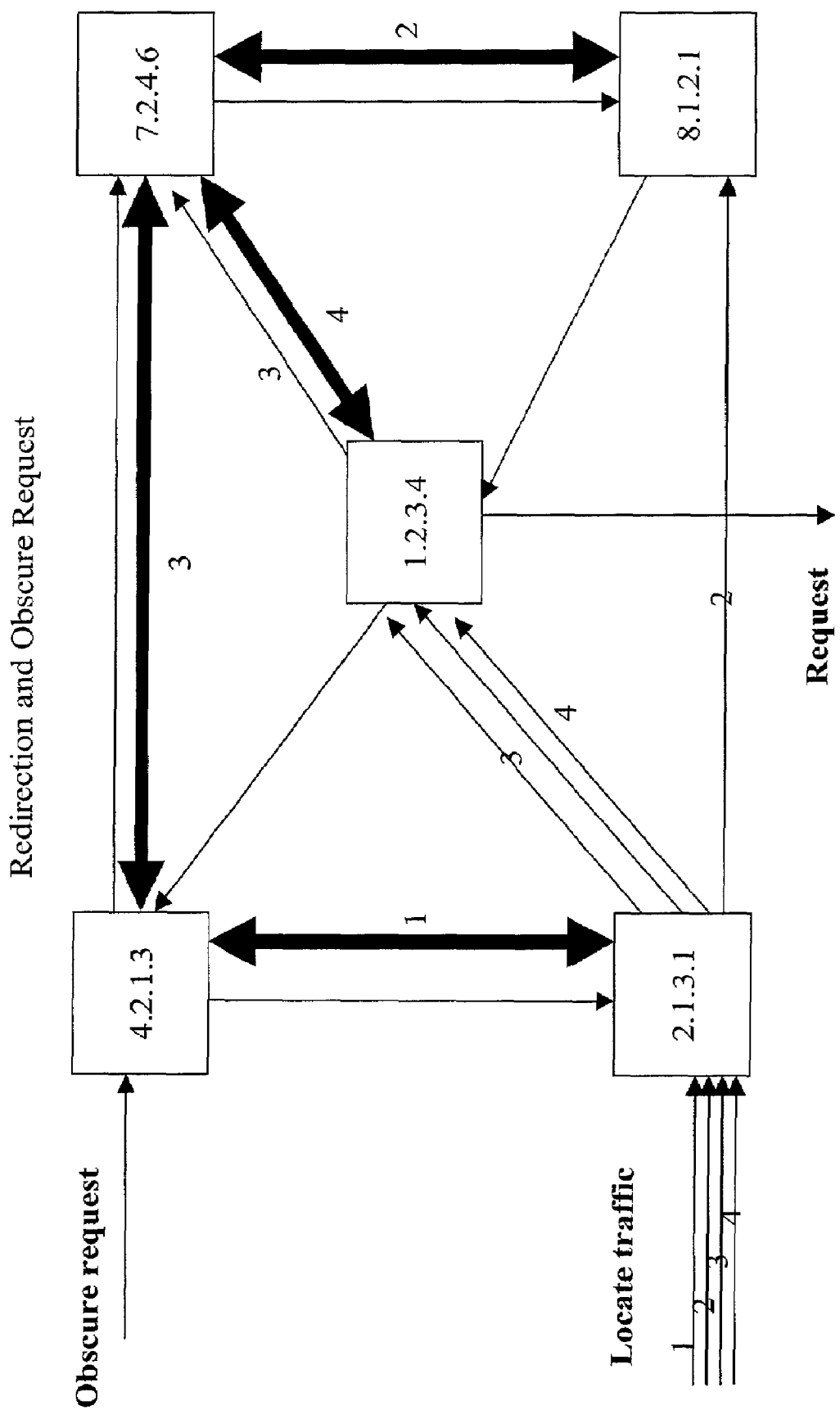
FIG. 6 illustrates an alternative application for multiple address translations, according to further embodiments of the present invention, allowing redirection and obscuring requests in a network.

In FIG. 6, two independent applications are shown. In the "Obscure Request" activity, an original request to be obscured is received at 4.2.1.3 and then passed through multiple address translations located at multiple sites before arriving at its intended destination so as to obscure characteristics of the datagram traffic such as distance, location, timing regularities, and other factors that could be used to track the source.

In the "Locate Traffic" instance, the deception provides the means for an individual at 2.1.3.1 to artificially and selectively impact traffic traveling over the infrastructure between other locations, and in doing so, observe the effect of this impact on other nodes to which there is access. This traffic modification method provides the means to detect the paths between other parties, and in so doing, to track traffic to its source while obscuring the source of the intelligence gathering activity and not sending any traffic to any of the elements participating in the activity under analysis observation. It is the multiple address translation that obscures the link between 2.1.3.1 and, for example, traffic between 4.2.1.3 and 7.2.4.6. Indeed, address translations can also be used in the generation of the traffic between these remote nodes so that the fact that they are only communicating between each other is obscured except to those who have a similar intelligence capability and are observing the traffic patterns in a similar manner.

This technique further may be based on the pre-placement of deception systems throughout infrastructures, which can be easily extended to arbitrary size by the multiple address translation deception mechanism. We have demonstrated reliable operation using up to 16 translations over long distances and there is no apparent limit to the ability to do this activity. These includes the routing of traffic back and forth between multiple machines to both induce increase infrastructure effects and to increase the obscuring effect.

Figure 13:
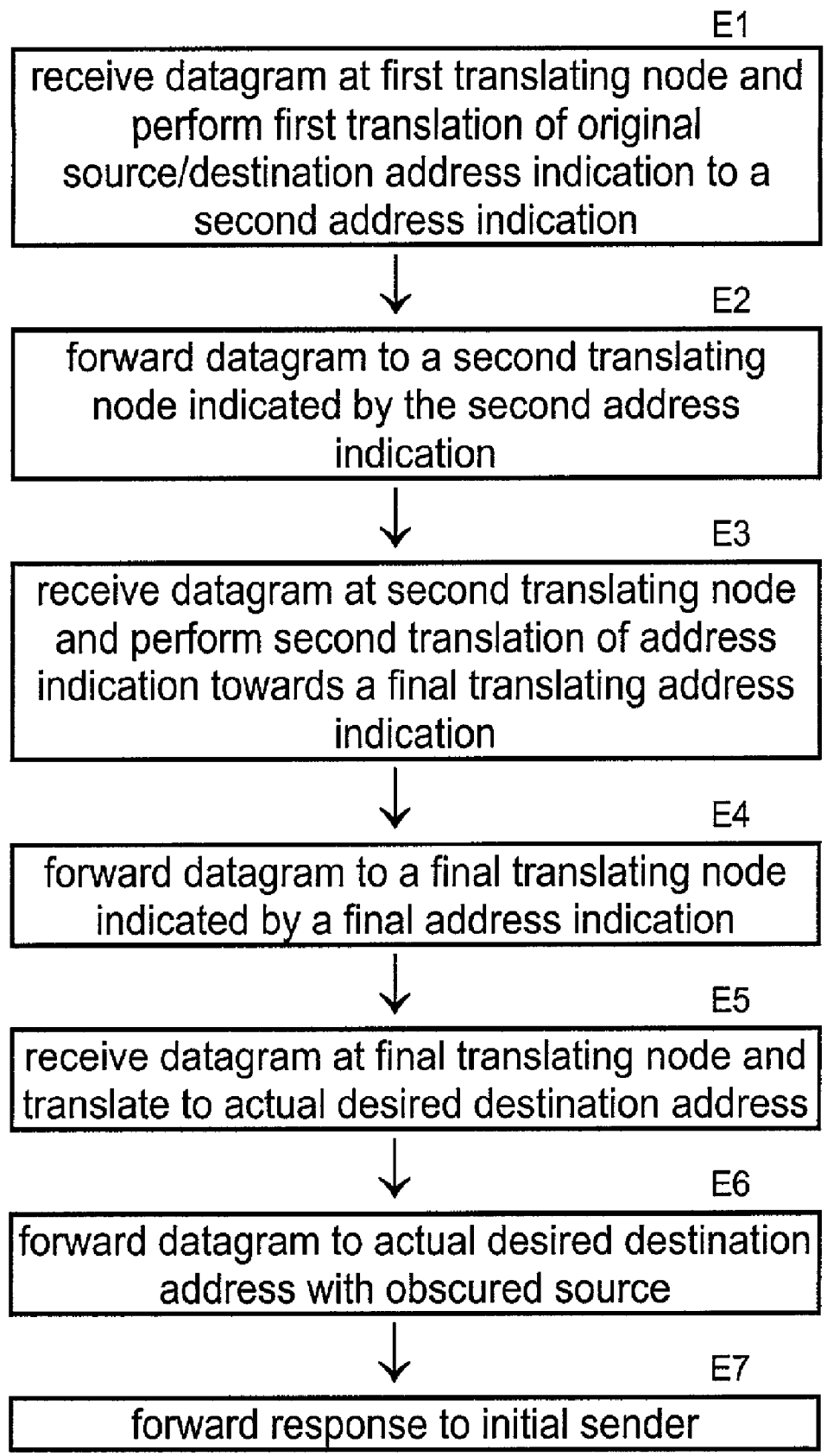
FIG. 13 is a flowchart illustrating a method for request obscuring according to embodiments of the present invention.

FIG. 13 is a flowchart illustrating a method for request obscuring according to embodiments of the present invention.

Distributed Computing Application

Large-scale parallel Multiple Instruction Multiple Data (MIMD) processing has been of increasing import in the last several years, largely because of the need for increased computing power of personal computers and the increasing need for computation that is easily distributed—such as large-scale searching of the Internet. According to a further embodiment of the present invention, multiple address translation can be used to make the physical location of distributed computing resources transparent and automatic to the programmer of distributed system software.

In this instance, the present invention can be adapted to enable physically distributing processing, using multiple address translation to create the deception to an MIMD processor that all of the resources are locally available and in a local address range. Therefore, an MIMD processing computer system programmer need not have to keep track of complex networking infrastructures and architecture.

Figure 7:
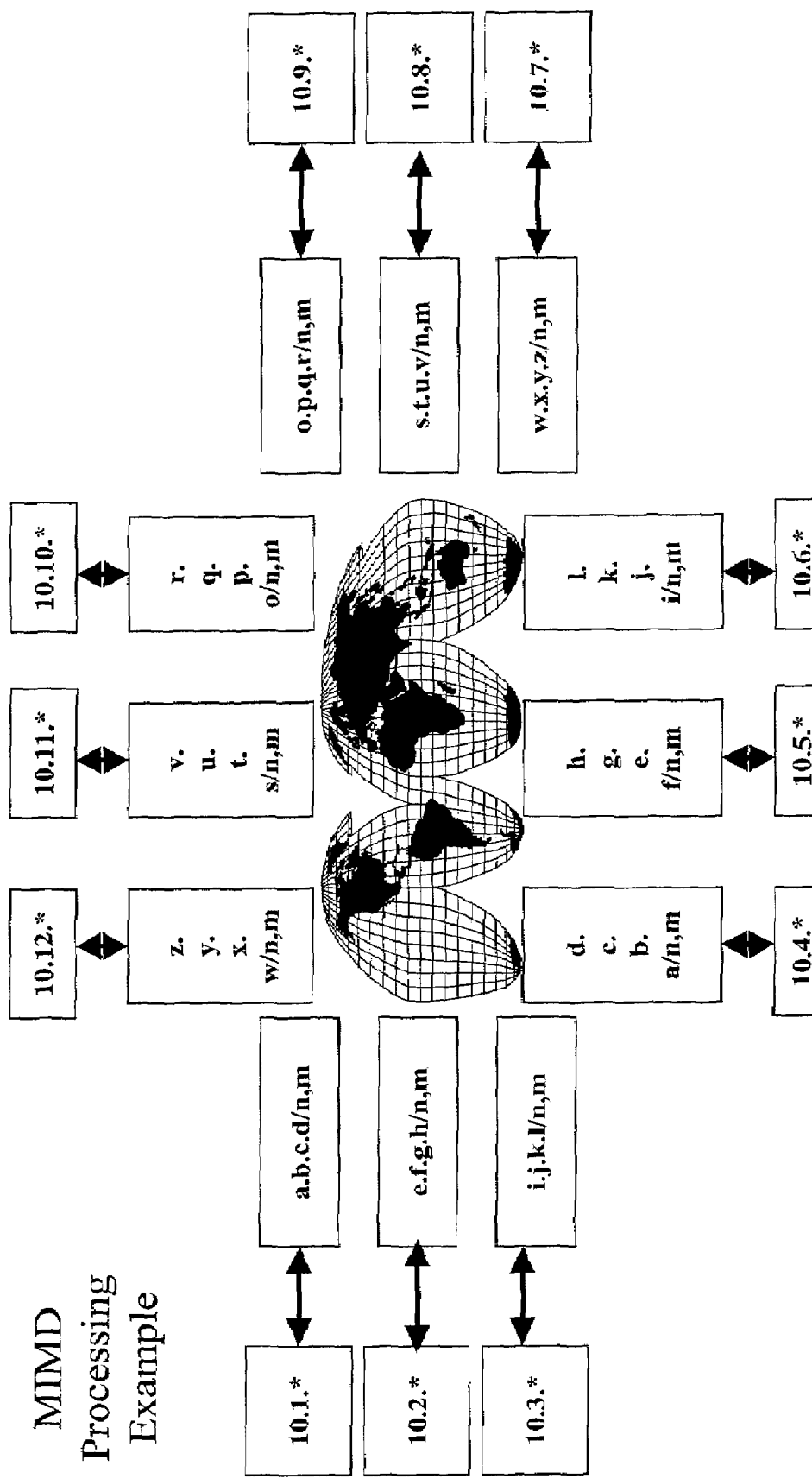
FIG. 7 is a block diagram illustrating use of address translation according to one embodiment of the present invention to facilitate MIMD computations.
Figure 8:
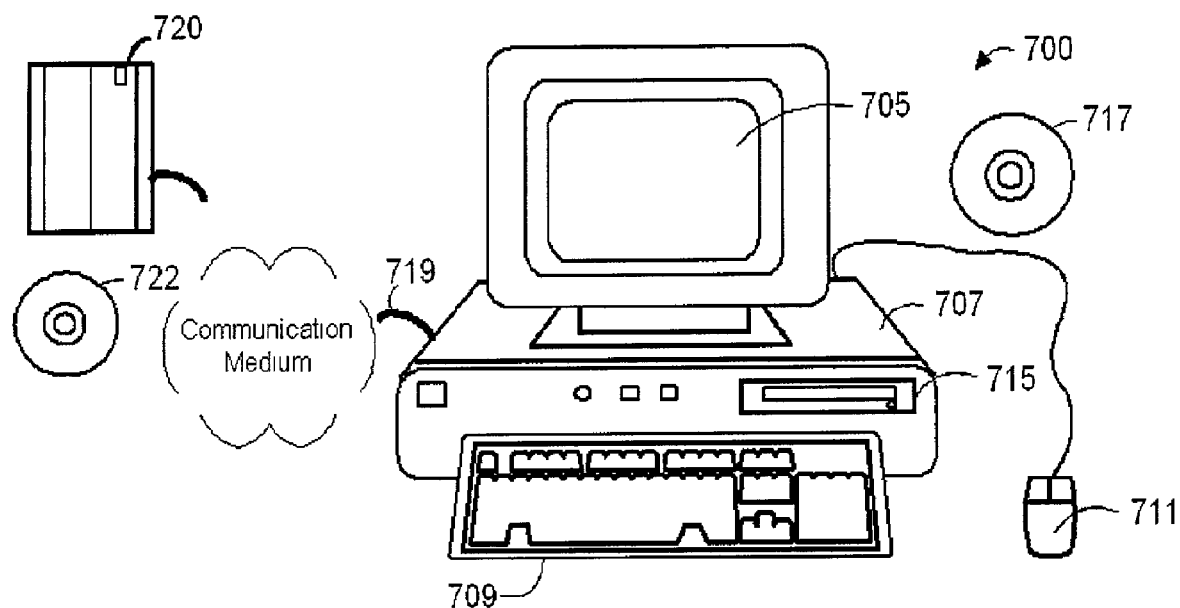
FIG. 8 is a block diagram illustrating a typical representative logic device in which various aspects of the present invention may be embodied.

Referring to FIG. 7, this embodiment of the invention can be understood in a configuration where up to 64,000 MIMD logic processing addresses are grouped into up to 255 separable MIMD LANs, with each MIMD LAN accessible through a translation gateway. For example, a parallel processing application according to this embodiment, can assign an entire internal Class A network (e.g. 10.*.*.*, capable of including up to about 16 million addresses) for parallel processing purposes. External to the parallel processing application, multiple address translation can be used to locate the physical computers at any address, while providing the illusion to the parallel processing application that they are all local and have a local IP address.

This is accomplished by utilizing a set of deception systems as described above. Each deception system translates between an internal address (e.g. 10.*.*.*) and an external address/port pair associated with the location of the appropriate remote computing resources assigned to that address. Then the data is transmitted (using the translated address) over the intervening infrastructure. Upon arrival at the distant location, a reverse translation is performed by a deception system residing at that distant location address, and the datagram is passed to the intended computer. This creates the deception that the source of the request is local to the intended computer.

This technique eliminates the need to differentiate between local and distant resources in MIMD programming or to have the users or programs know anything about the topology of the intervening network. This is, of course, is done at the expense of abstracting out the communications overhead from the programming task. In cases where the underlying assumptions are poor, this is could cause significant performance degradation.

In FIG. 7, each portion of the distributed computing environment can include up to about 64,000 different IP addresses (as designated by 10.1.*.*; 10.2.*.*; 10.3.*.*; 10.4.*.*; etc. At times, an address such as 10.1.*.* can also be indicated as 10.1.*), and each deception IP address translation element (such as a.b.c.d./n.m and the other eleven translation modules shown in the figure) has the ability to translate between all of the 10.*.*.* IP addresses (more than 16 million of them) and the IP addresses assigned to the address translation modules.

In a particular embodiment, emulation components (i.e. the translation gateways) gateways)translates all of these addresses (10.*.*.*) into a form that uses the port number in the IP protocol to hold the last two parts of the IP address of the remote computer within its class B subnetwork (e.g. 10.3.*.*, where a.b.c.d gets translated to 10.3.a.b/c.d). A lookup table at an emulation element is used to indicate which remote IP address to use for each remote class B network. Thus, each emulation element in FIG. 7 can be understood to contain a table or translation algorithm that accomplishes translations in two ways of the general form:

| MIMD (Local) Address | | Assigned IP (External) Address |
|---|---|---|
| 10.1.n.m | ←→ | 202.13.233.5/n.m |
| 10.2.n.m | ←→ | 122.211.2.125/n.m |
| ... | | |
| 10.255.n.m | ←→ | 71.151.2.8/n.m |

In this case, the Internet or other intervening infrastructure is used to transport the datagrams between MIMD (i.e. class B) subnetworks, using the assigned deceptive IP addresses and port numbers as addresses in place of the internal addressing scheme. The multiple address translation eliminates the requirement for nodes to do anything special in order to reach other nodes, regardless of their physical location, even though the internal addressing scheme is incompatible with the external addressing scheme (in this case, the Internet).

From the perspective of the Internet as a whole, in this example, an entire 16 million element network (e.g. 10.*.*.*) consumes only 255 individual IP addresses, assuming that the MIMD processors can be reached by the up to 255 IP locations that are performing the address translation. In specific embodiments, these up to 255 IP addresses can change over time to meet the changing infrastructure without affecting the internal operations of MIMD modules. Even a translation into a different internetworking protocol can be accommodated without reconfiguring the 16 million nodes in the distributed system because of the deception used to abstract the realities of networking from the system in the view from the parallel processing environment.

With currently available networking technology, this may be a two-step process because some currently available hardware systems can typically only do address translation for about 4,000 IP addresses. This leads to a multiple address translation process generally using multiple network computers. In further embodiments, a special purpose implementation of an address translation system can be constructed and can facilitate the required level of translations without undue difficulty. An example of such a system would be a computer that sniffs all network traffic and generates packets to reflect the proper translation.

This example is different from the previous examples because the deception is not intended to 'fool' anyone into misunderstanding the operation of the network. Rather, it is intended to aide the user by abstracting the physical location of computers. It is, in a sense, complementary to the earlier examples. In the previous examples, 'external' users are deceived into believing that there is no intervening infrastructure when there is; while in this example, 'internal' users (i.e. the MIMD executable programs) are provided the abstraction that there is no intervening Internet infrastructure, while 'external' users can clearly see that the network is fragmented over many locations.

Thus, with such a system in place, computers participating in the MIMD calculation can communicate with any of up to 16M other addressed processors as though they were all on the same 10.*.*.* subnetwork. Each processor will use the appropriate 10.n.n.n address to communicate with another processor, and the multiple address translation system according to the present invention will handle translation to the remote computer, even on a wholly different IP address.

Figure 14:
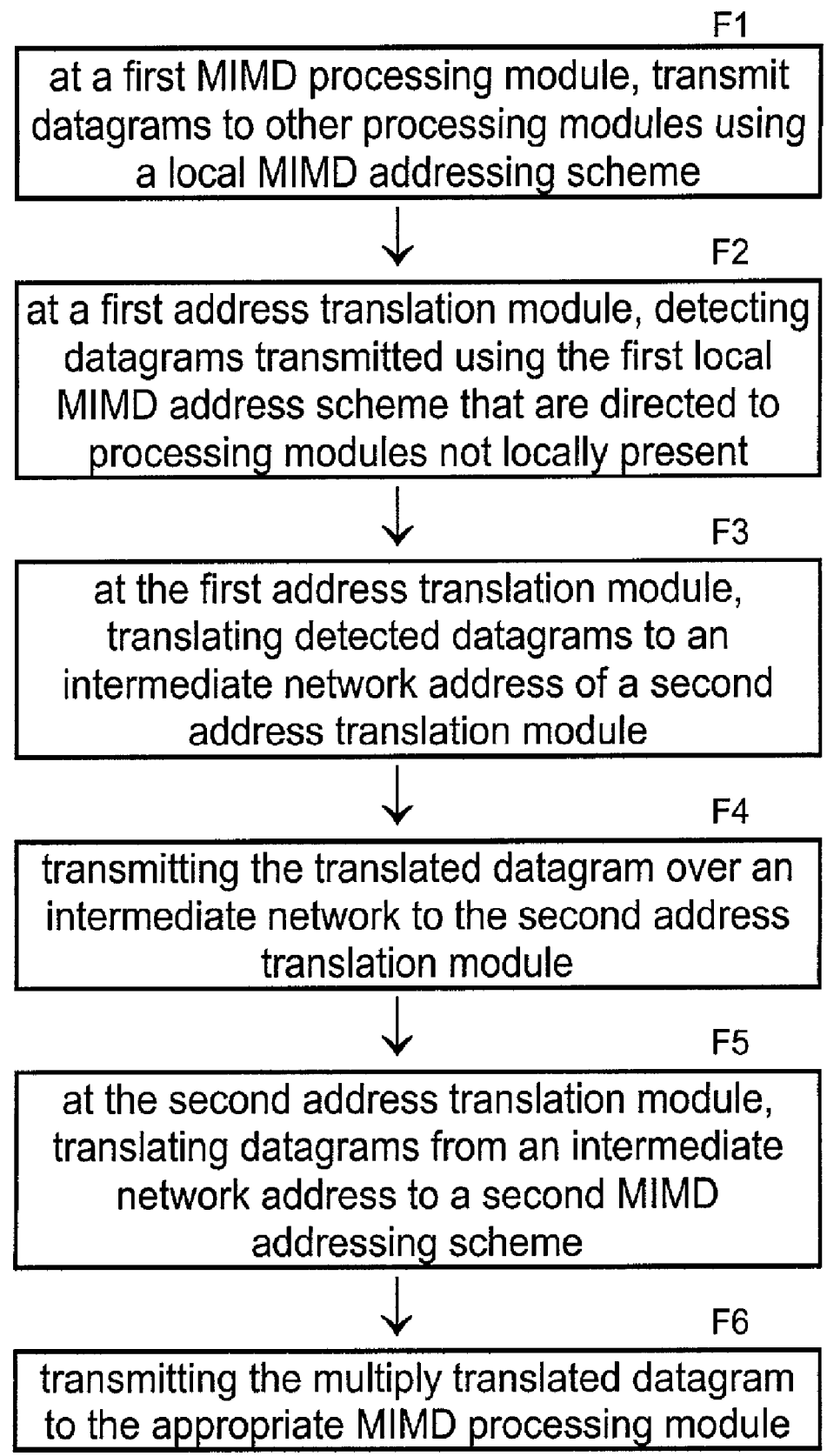
FIG. 14 is a flowchart illustrating a method for enabling multiple logic processing according to embodiments of the present invention.

FIG. 14 is a flowchart illustrating a method for enabling multiple logic processing according to embodiments of the present invention.

Software Implementation Example

In each of the above discussed examples, a variety of similar mechanisms may be used to provide address translation as will be understood to those of skill in the art from the teachings provided herein. These mechanisms include: (1) multiple proxy-based network address translations and (2) multiple addresses associated with a given network device.

A specific example of this can be implemented using the Unix programs: (1) 'ipfwadm', (2) 'TCP wrappers', (3) 'ifconfig', and (4) 'netcat'. The Internet Deamon configuration file (/etc/inetd.conf) is altered so that, in place of the normal service provided on a given port, netcat is used as a proxy server to forward datagram content from a given source to a new destination, replacing the source address of the original datagram with the source address of the interface used for datagram forwarding to the specified destination. In this case, each external IP address is redirected to a different internal IP address. Within the inetd.conf file, TCP wrappers is specified for handling datagrams:

s22 stream tcp nowait root /etc/tcpd /usr/local/sbin/sshd2-i

Then, within TCP wrappers, each incoming IP address is forwarded to a corresponding translated IP address in the 10.1.*.* IP address range:

| sshd2@204.7.229.1: | all: | twist /u/fc/bin/nc -w 3 10.1.0.1 22 |
|---|---|---|
| sshd2@204.7.229.2: | all: | twist /u/fc/bin/nc -w 3 10.1.0.255 22 |
| sshd2@204.7.229.255: | all: | twist /u/fc/bin/nc -w 3 10.1.0.255 22 |

This alteration is combined with multiple network cards and multiple addresses for one of the network cards (eth0 in this case) and is implemented using ifconfig by placing multiple ifcfg-eth0.* files in /etc/sysconfig/network-scripts as follows (under Redhat Linux):

```
#!/bin/bash
for i in 'count 1 255'
   do
      echo "DEVICE=eth0"  /etc/sysconfig/network-scripts/ifcfg-eth0.$i
      echo "IPADDR=204.7.229.$i"  /etc/sysconfig/network-scripts/ifcfg-
         eth0.$i
      echo "NETMASK=255.255.255.0"  /etc/sysconfig/network-scripts/ifcfg-
         eth0.$i
      echo "NETWORK=204.7.229.0"  /etc/sysconfig/network-scripts/ifcfg-
         eth0.$i
      echo "BROADCAST=204.7.229.255"
         /etc/sysconfig/network-scripts/ifcfg-
         eth0.$i
      echo "ONBOOT=yes"  /etc/sysconfig/network-scripts/ifcfg-eth0.$i
done
```

When run from within the /etc/sysconfig/network-scripts directory in RedHat Linux, this causes multiple runs of ifconfig at system startup, corresponding to each of 255 IP addresses on network card eth0. On a second Ethernet card, a similar configuration is used with only one IP address. The system is configured to gateway datagrams between its two network cards so that the 'routed' program yields the following output:

| Destination | Gateway | Genmask | Flags | Metric | Ref | Use | Iface |
|---|---|---|---|---|---|---|---|
| 204.7.229.0 | * | 255.255.255.0 | U | 0 | 0 | 69 | eth0 |
| 127.0.0.0 | * | 255.0.0.0 | U | 0 | 0 | 119 | lo |
| 10.0.0.0 | * | 255.0.0.0 | U | 0 | 0 | 17 | eth1 |

The net effect is that traffic sent to 204.7.229.a is translated into traffic from 10.0.0.a to 10.1.0.a, where 'a' corresponds to the last byte of the IP address. Thus, datagrams destined for 204.7.229.a entering from Ethernet 0 (204.7.229.*) will be routed to Ethernet 1 with new addresses assigned, and return traffic will be routed back in the reverse direction with the reverse translation.

To translate back, within the 10.*.*.* network, we then implement another system which operates in much the same way, except that it translates between the 10.1.*.* address range and the 204.7.229.* address range. This is done by replacing every occurrence of 10.0.0.x with 204.7.229.x and every occurrence of 204.7.229.y with 10.1.0.x in the above descriptions.

The reason this works is a bit tricky. In effect, multiple address translations are used to 'trick' the network routing mechanisms into routing traffic into the deception network instead of routing it back into the outside network. If the address translation were attempted in a single step, it would fail because it would be impossible to determine which datagrams were destined for which network; and the routing mechanisms of the Internet would automatically route the translated traffic to the nearest location, which would always be the wrong one for purposes of routing to a deception system. By using two or more translations, traffic is routed into the deception network while allowing identical datagrams in the deception network to those in the original network.

Additional translations can be done if desired, for example, to route the deception through further networks to get to a particular computing resource. In this case, we create a series of translations, for example, from 10.0.*.* to 10.1.*.* to 10.2.*.* to 10.3.*.* to 10.4. *.*, and so on, eventually returning to 10.0.*.* at a different location. This multiple translation mechanism can also be used to induce large volumes of traffic between a small number of network systems, or to cover any given set of network paths. This is done by causing the translation sequence to traverse the same path multiple times but with different IP address or port assignments. This implements the examples in FIG. 6.

These same mechanisms have been experimentally used in other versions of Unix and Unix-like operating environments, and the proxy forwarding application (FIG. 4B, where m.n.o.p gets translated through a.b.c.g) has been experimentally demonstrated in Windows NT and other Windows systems using the 'nc' program as the proxy forwarding program.

Embodiment in a Programmed Digital Apparatus

The invention may be embodied in a fixed media or transmissible program component containing logic instructions and/or data that when loaded into an appropriately configured computing device cause that device to perform in accordance with the invention.

FIG. 14 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as cameras, displays, image editing equipment, etc.

CONCLUSION

The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A computer network emulation wall and emulation system comprising:
   two or more emulation computer systems of at least two distinct types;
   a network able to deliver datagrams to said two or more emulation computer systems through said emulation wall; and wherein two or more of said two or more emulation computer systems provide emulation responses of multiple emulated computer systems at multiple addresses;

each emulation computer system providing emulation responses of emulated computers appropriate to said emulation computer system's type;

and further comprising:

receiving a response at an inside of said emulation wall from said emulation subnetwork;

translating a response emulation original address indication to a response proxy address indication;

passing said datagram into said network from said emulation subnetwork while translating said response proxy address indication back to a response original address indication;

wherein said passing comprises:

receiving said datagram at a first network gateway;

translating said original address indication of said datagram into a proxy address indication at said first network gateway;

routing said datagram with said proxy address indication to a second network gateway;

translating said proxy address indication of said datagram into said emulation original address indication at said second network gateway; and forwarding said datagram with said emulation original address indication to said emulation subnetwork.

2. The device according to claim 1 further comprising:
at least one of said emulation computer systems responding to multiple incoming addresses on said communication channel as though said at least one emulation system were multiple logic systems.

3. The device according to claim 2 further comprising:
on at least one of said emulation systems, providing varying responses.

4. The device according to claim 3 wherein said responses vary based on an incoming address.

5. The device according to claim 3 wherein said varying responses comprise varying time and use characteristics.

6. The system according to claim 1 further comprising:
a transmission control system able to establish and vary delivery paths to said emulation computer systems.

7. The system according to claim 1 further comprising:
an emulation control system able to establish and vary emulations provided by said two or more emulation computer systems.

8. The method according to claim 1 wherein address indications comprise source and destination addresses according to a standard networking protocol.

9. The method according to claim 8 wherein address indications comprise source and destination addresses according to an IP networking protocol.

10. The method according to claim 1 wherein said emulation original address indication is identical to said original address indication.

11. The method according to claim 1 wherein said first network gateway is a standard network gateway;
said translating said original address indication of said datagram into a proxy address indication at said first standard network gateway uses using-a standard translation procedure;
said second network gateway is a standard network gateway;
said translating said proxy address indication of said datagram into said emulation original address indication at said second standard network gateway using a standard translation procedure.

12. The method according to claim 1 wherein said emulations vary based on one or more parameters including datagram addresses, time, or usage statistics.

13. The method according to claim 1 wherein an emulation at a particular IP address translates same services differently for different remote access points, creating for a first set of remote access points, an illusion of a first network, for a second set of remote access points, an illusion of a service system with a vulnerable deception target, and for a third set of remote access points, access to other systems.

14. The system according to claim 1 further wherein:
said two or more emulation computer systems of at least two distinct types comprise two or more simulated computer systems.

15. The system according to claim 1 further wherein:
said at least two distinct types comprise two types selected from the group consisting of:
a first server application;
a second server application;
a first version of a personal computer operating system;
a second version of said personal computer operating system;
a firewall;
a private network.

16. The system according to claim 15 further wherein:
said emulation responses of multiple emulated computer systems at multiple addresses are not detectable as emulations but are perceived as multiple individual computer systems by any system connecting through said emulation wall.

17. The system according to claim 1 further wherein said network emulation wall and emulation system execute on a hardware device connected on said network.

18. The system according to claim 1 further wherein said emulation wall and emulation system reside on a computer network with a plurality of nodes, at least some of said nodes able to forward packets to said system.

19. The system according to claim 1 further wherein said emulation wall and emulation system are embodied in a single network device.

20. The system according to claim 1 further wherein said emulation wall and emulation system are embodied in multiple network devices.

* * * * *